US012467612B1

(12) United States Patent
Kelley

(10) Patent No.: US 12,467,612 B1
(45) Date of Patent: Nov. 11, 2025

(54) BRACKET FOR MOUNTING LIGHTS

(71) Applicant: Faboricus, LLC, Seattle, WA (US)

(72) Inventor: Chris Kelley, Shoreline, WA (US)

(73) Assignee: Faboricus, LLC, Denver, CO (US)

( * ) Notice: Subject to any disclaimer, the term of this patent is extended or adjusted under 35 U.S.C. 154(b) by 0 days.

(21) Appl. No.: 19/012,800

(22) Filed: Jan. 7, 2025

(51) Int. Cl.

| | |
|---|---|
| ***F21V 21/088*** | (2006.01) |
| ***A47G 33/00*** | (2006.01) |
| ***F21S 4/00*** | (2016.01) |
| ***F21S 4/10*** | (2016.01) |
| ***F21S 4/15*** | (2016.01) |
| ***F21S 8/00*** | (2006.01) |
| ***F21V 19/00*** | (2006.01) |
| ***F21W 121/04*** | (2006.01) |

(52) U.S. Cl.
CPC ............ *F21V 21/088* (2013.01); *F21S 8/036* (2013.01); *A47G 33/00* (2013.01); *F21S 4/00* (2013.01); *F21S 4/10* (2016.01); *F21S 4/15* (2016.01); *F21S 8/033* (2013.01); *F21S 8/037* (2013.01); *F21V 19/0055* (2013.01); *F21W 2121/04* (2013.01)

(58) Field of Classification Search
CPC .... F21S 8/033; F21S 8/036; F21S 4/10; F21S 4/15; F21S 4/00; F21S 8/037; F21V 19/0055; F21W 2121/04
See application file for complete search history.

(56) References Cited

U.S. PATENT DOCUMENTS 3,193,229 A 7/1965 Stock
4,714,219 A 12/1987 Mayse
4,795,121 A * 1/1989 Comito ..................... F21S 4/10 248/314
4,901,212 A 2/1990 Prickett
D319,575 S 9/1991 Young
D321,125 S * 10/1991 Gary .............................. D8/373
D365,014 S 12/1995 Fennessy et al.
6,340,238 B1 1/2002 Pan
6,536,730 B1 3/2003 Baer
D824,246 S 7/2018 Ming
D939,335 S 12/2021 Kennedy
2006/0152927 A1 7/2006 Vendrick
(Continued)

FOREIGN PATENT DOCUMENTS

EP 0377524 A2 7/1990

OTHER PUBLICATIONS

Massive Eco Govee (Pro) Outdoor LED Light Side Mounting Bracket—Downward Facing; https://www.massiveeco.com/products/govee-pro-outdoor-led-light-side-mounting-bracket-downward-facing (Year: 2024).*
(Continued)

*Primary Examiner* — Colin J Cattanach
(74) *Attorney, Agent, or Firm* — Law Office of Karen Dana Oster, LLC

(57) ABSTRACT

A bracket for mounting a light includes a horizontal surrounding body and an associated vertical mounting base. The surrounding body has a light-supporting aperture defined therein. A string slot is defined in the surrounding body on opposite sides of the light-supporting aperture. The surrounding body is associated with the mounting base such that sides of the mounting base extend beyond sides of the surrounding body.

30 Claims, 28 Drawing Sheets

(56) References Cited

U.S. PATENT DOCUMENTS

| | | | | |
|---|---|---|---|---|
| 2011/0194292 | A1* | 8/2011 | Tsai | F21S 4/10 362/231 |
| 2013/0333185 | A1 | 12/2013 | Adams | |
| 2015/0159844 | A1* | 6/2015 | Flaherty | F21S 4/10 362/249.02 |
| 2018/0042421 | A1 | 2/2018 | Bennett | |
| 2018/0259167 | A1* | 9/2018 | Krieger | F21V 23/001 |
| 2022/0333747 | A1* | 10/2022 | Lin | F21S 4/10 |
| 2023/0160561 | A1 | 5/2023 | Lewis | |
| 2024/0035652 | A1* | 2/2024 | Dai | H05B 45/325 |
| 2025/0198602 | A1* | 6/2025 | Guo | F21V 15/01 |

OTHER PUBLICATIONS

Massive Eco Govee (Pro) Outdoor LED Light Side Mounting Bracket—Downward Facing—Wayback Machine Date; https://web.archive.org/web/20241209091325/https://www.massiveeco.com/products/govee-pro-outdoor-led-light-side-mounting-bracket-downward-facing (Year: 2024).*

Massive Eco—Govee (Pro) Outdoor LED Light Side Mounting Bracket—Downward Facing 3; https://www.massiveeco.com/products/govee-pro-outdoor-led-light-side-mounting-bracket-downward-facing-3 (Year: 2024).*

Massive Eco—Govee (Pro) Outdoor LED Light Side Mounting Bracket—Downward Facing 3—Wayback Machine; https://web.archive.org/web/20241209091752/https://www.massiveeco.com/products/govee-pro-outdoor-led-light-side-mounting-bracket-downward-facing-3 (Year: 2024).*

Govee Compatible Permanent Outdoor Lights Mounting Bracket—DeliciosaDecor; https://www.etsy.com/shop/DeliciosaDecor?ref=shop_profile&listing_id=1832160761 (Year: 2024).*

Govee Compatible Permanent Outdoor Lights Mounting Bracket—DeliciosaDecor 2; https://www.etsy.com/shop/DeliciosaDecor?ref=shop_profile&listing_id=1832160761 (Year: 2024).* amazon.com; Holiday Lighting Outlet Magnet Clip for C9 Holiday Lighting Sockets, can be Used for Patio Lighting, Pack of 25; abbreviated product pages; published at amazon.com/dp/B013REHQV6/ref=sspa_dk_detail_3 at least as early as Dec. 31, 2024; 9 pages.

amazon.com; 100 Pcs Outdoor Light Clips Clear Cable Clips Christmas String Light Clip Self Adhesive Cable Hooks Easy Cord Organizer Durable Wire Holder for Christmas Ornaments Fairy Lights and Decorations; abbreviated product pages; published at amazon.com/Christmas-Adhesive-Organizer-Ornaments-Decorations/dp/B0DC9KCRCH at least as early as Dec. 31, 2024; 7 pages.

amazon.com; 100Pack Large Hooks for Outdoor String Lights Clips No-Damage, Tool-Free Installation for Christmas, Patio, Garden, Balcony Decor, Cable Holders for Hanging; abbreviated product pages; published at amazon.com/AFFAVON-Large-No-Damage-Tool-Free-Installation/dp/B0DHTXGZF4 at least as early as Dec. 31, 2024; 9 pages.

amazon.com; All-Purpose Holiday Lights [Set of 600] Christmas Light Clips, Outdoor Light Clips—Mount to Shingles & Gutters—Works with Mini, C6, C7, C9, Rope, Icicle Lights—No Tools Required—USA Made; abbreviated product pages; published at amazon.com/SEWANTA-All-Purpose-Light-Clips-Holder/dp/B07Y2DKR9W at least as early as Dec. 31, 2024; 11 pages.

amazon.com; Novelty Lights 39025 Surface Mount Christmas Light Clip, C7/C9 Base, Flat Surface Facia Mount, 100 Pack; abbreviated product pages; published at amazon.com/Novelty-Lights-39025-Surface-Christmas/dp/B0063RCJ1C at least as early as Dec. 31, 2024; 2 pages.

amazon.com; Yousoontic 50Pcs Christmas Light Clips, Gutter Light Clips Fascia Boards Hanger Plastic Holiday Light Clip for Clay Tile Roof Christmas Party Decoration Roof Gutter Fence Eave; abbreviated product pages; published at amazon.com/Yousoontic-Christmas -Plasti-Holiday-Decoration/dp/B0DJP59882 at least as early as Dec. 31, 2024; 3 pages.

amazon.com; Zonon 100 Pcs Christmas Light Clip Metal Lights Gutter Hooks for Outdoor Lights Xmas Light Hangers for Shingles Roof Seasonal Lighting Gutter Clips Hanging Festival Xmas Outside Decoration; abbreviated product pages; published at amazon.com/Zonon-Christmas-Shingles-Seasonal-Decoration/dp/B0CBMGDQJV at least as early as Dec. 31, 2024; 2 pages.

amazon.com; Holiday Christmas Light Hangers 2" (1 ⅝") Fascia Boards Clip Made in the USA; abbreviated product pages; published at amazon.com/Kwik-Clip-Holiday-Christmas-Fascia/dp/B00P6X9R32 at least as early as Dec. 31, 2024; 14 pages.

brightown.com; Christmas Mini Plastic Lights Clips; abbreviated product pages; published at brightown.com/products/christmas-plastic-lights-clips-mini at least as early as Dec. 31, 2024; 10 pages.

christmaslights.io; Discover the Different Types of Light Clips; blog post; published at christmaslights.io/blog/b/discover-the-different-types-of-light-clips at least as early as Dec. 31, 2024; 9 pages.

christmaslights.io; Illuminate Your Home: A Step-by-Step Guide to Hanging Christmas Lights; blog post; published at christmaslights.io/blog/b/illuminate-your-home-a-step-by-step-guide-to-hanging-christmas-lights at least as early as Dec. 31, 2024; 14 pages.

etsy.com; Faboricus product pages; screen captures; published at https://www.etsy.com/shop/Faboricus at least as early as Feb. 13, 2024; 4 pages.

etsy.com; Govee Pro-Compatible Side-Mount Outdoor Light Mounting Bracket for Permanent Outdoor Pro Lights; screen captures; published at https://www.etsy.com/listing/1638669672/govee-pro-compatible-side-mount-outdoor?click_key=e683c4ca2846aa1f70cda47c8fda971cc99f011e%3A1%E2%80%A6 at least as early as Feb. 24, 2024; 3 pages.

govee.com; Govee Permanent Outdoor Lights 2; abbreviated product pages; published at us.govee.com/products/govee-permanent-outdoor-lights-2 at least as early as Dec. 31, 2024; 21 pages.

govee.com; Govee Permanent Outdoor Lights Pro; abbreviated product pages; published at us.govee.com/products/govee-rgbicww-led-permanent-outdoor-lights at least as early as Dec. 31, 2024; 34 pages.

hlolighting.com; Combo C Christmas Light Clips; abbreviated product pages; published at hlolighting.com/products/combo-c-christmas-light-clips at least as early as Dec. 31, 2024; 5 pages.

hlolighting.com; Shingle Tabs for Christmas Lights; abbreviated product pages; published at hlolighting.com/products/shingle-tabs-for-christmas-lights at least as early as Dec. 31, 2024; 13 pages.

lowes.com; Holiday Living 12-Pack Plastic Soffit/Fascia Clips; abbreviated product pages; published at lowes.com/pd/Holiday-Living-12-Pack-Plastic-Soffit-Fascia-Clips/1000803468 at least as early as Dec. 31, 2024; 3 pages.

printables.com; Govee Permanent Outdoor Lights Pro Mounting Brackets & Accessories; screen captures; published at https://www.printables.com/model/630613-govee-permanent-outdoor-lights-pro-mounting-bracke/files at least as early as Oct. 30, 2023; 7 pages.

printables.com; Govee Permanent Outdoor Lights Pro Mounting Bracket; screen captures; published at https://www.printables.com/model/676612-govee-permanent-outdoor-lights-mounting-bracket/files at least as early as Dec. 10, 2023; 4 pages.

printables.com; Side Mounts Compatible with Govee Permanent Outdoor Pro Lights; screen captures; published at https://www.printables.com/model/712316-side-mounts-compatible-with-govee-permanent-outdoo at least as early as Jan. 7, 2024; 1 page.

reddit.com; Screen captures of Side Mounts Compatible with Govee Permanent Outdoor Pro Holiday Lights . . . discussion post; published at https://www.reddit.com/r/functionalprint/comments/1915pqf/side_mounts_compatible_with_govee_permanent/ at least as early as Jan. 7, 2024; 1 page.

reddit.com; Screen captures of Side Mounts Compatible with Govee Permanent Outdoor Pro Lights . . . discussion post; published at https://www.reddit.com/r/Govee/comments/1915gii/side_mounts_compatible_with_govee_permanent/ at least as early as Jan. 7, 2024; 1 page.

Etsy.com; DeliciosaDecor product pages; screen captures; published at https://www.etsy.com/shop/deliciosadecor at least as early as Nov. 25, 2024; 10 pages.

Etsy.com; DeliciosaDecor product pages including light mount bracket reviews; screen captures; published at https://www.etsy.com/shop/deliciosadecor; earliest relevant reviews published Dec. 1, 2024; 18 pages.

(56) References Cited

OTHER PUBLICATIONS

Etsy.com; GeekGeniusCollective all items pages; screen captures; published https://www.etsy.com/shop/GeekGeniusCollective at least as early as 2025; 7 pages.
Etsy.com; GeekGeniusCollective product pages; screen captures; published https://www.etsy.com/shop/GeekGeniusCollective at least as early as Sep. 9, 2025; 11 pages.
Etsy.com; Klymar product pages; screen captures; published at https://www.etsy.com/shop/Klymar at least as early as Dec. 5, 2024; 7 pages.
Govee Installer Directory; Govee Mounts from PrintWorks 3D; compilation of screen captures; published at https://printworks-3d.com/collections/all-products/products/permanent-outdoorled- 90-degree-mount-for-non-pro-2 and https://printworks-3d.com/collections/all- products/products/permanent-outdoor-led-90-degree-mount-for-pro-2 at least as early as 2025; 11 pages.
Massiveeco.com; Govee (PRO) Outdoor LED Light Side Mounting Bracket—Downward Facing; screen captures; published at https://www.massiveeco.com/collections/govee-light-brackets at least as 2025; 13 pages.
Reddit.com; Screen captures of user pages (under user name u/Over_Knowledge_1114); published as early as Jan. 21, 2025 (based on earliest relevant post occurring 247 days prior to the screen capture date of Sep. 25, 2025); 4 pages.

* cited by examiner

FIG. 57
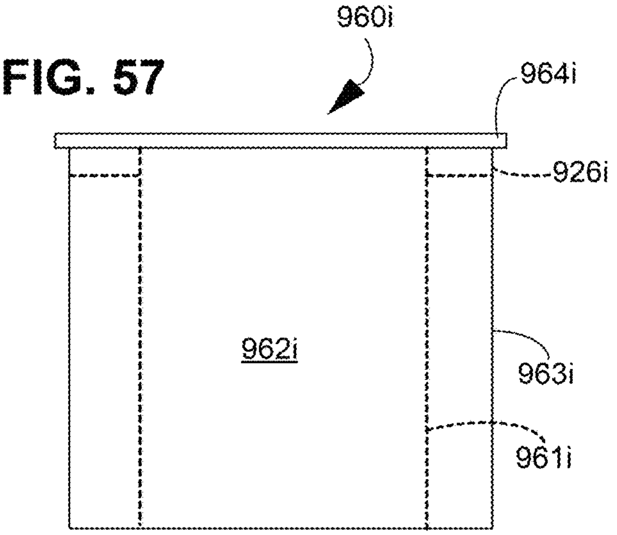
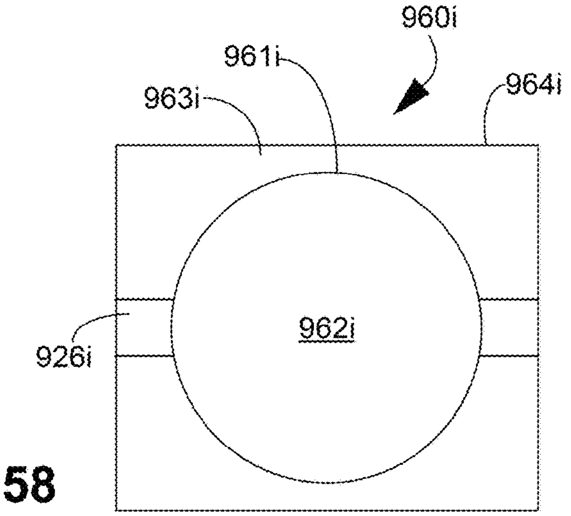
FIG. 58
FIG. 59
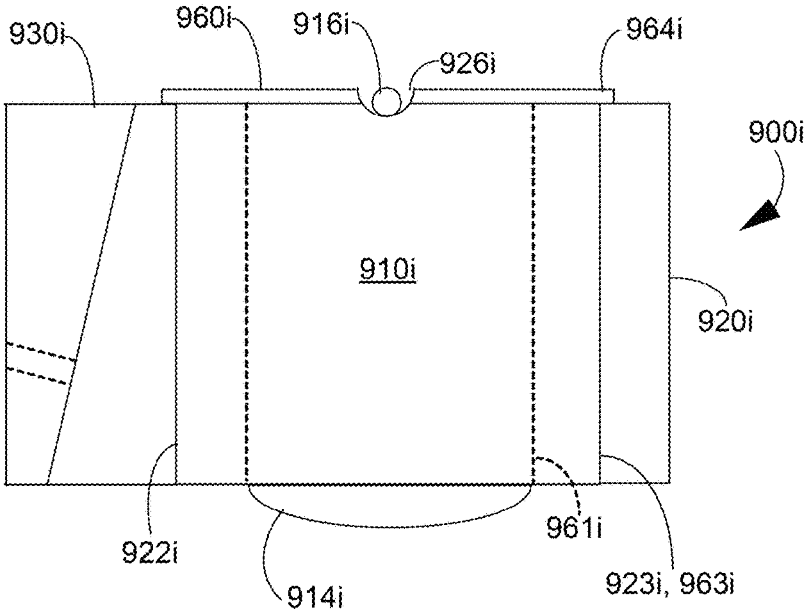

BRACKET FOR MOUNTING LIGHTS

The present application is an application claiming the benefit of U.S. Provisional Patent Application No. 63/741,800, filed Jan. 3, 2025. The present application is a continuation-in-part application claiming the benefit of U.S. Design patent application Ser. No. 29/968,985, filed Oct. 20, 2024. The present application is based on and claims priority from these applications, the disclosures of which are hereby expressly incorporated herein by reference in their entirety.

BACKGROUND

The present disclosure describes apparatuses, methods, and/or systems that generally relate to the technical field of brackets, and in particular relate to brackets for mounting lights.

Decorating the outside of a house (or other building) with lights tends to be thought of as a Christmas tradition. The tradition began in the 17$^{th}$ century in Europe with candles lit inside the house, but visible from the outside through the windows. In 1882, Thomas Edison introduced the first outdoor electric light display by displaying lights outside of his laboratory. A few years later, the first string of lights (light string) was created by Edward Johnson, an inventor who worked with Thomas Edison. Soon commercial stores and public buildings began using the strings of lights. Companies, such as NOMA (founded by Albert, Henri and Leon Sadacca), played a role in making strings of lights safer and more affordable. By the mid 1900's, relatively safe and affordable electric lights became increasingly popular to use for outdoor light displays on homes. Light-emitting diode (LED) lights provided improvements such as being energy-efficient and environmentally friendly.

Lights today come in a plethora of types, sizes, shapes, and styles. For example, the lights may be incandescent or LED. The light may flicker or be on constantly. Some of the available sizes are C3, C5, C6, C7, and C9. They may be shaped like bulbs, snowflakes, fruit, or almost any other shape. Exemplary lights include, but are not limited to, C7 LED Incandescent, C9 LED Incandescent, G20 LED, G30 Incandescent, G40 Incandescent, Flicker Flame Incandescent, S14/T50 LED Incandescent, 11S14 Incandescent, A15 Incandescent, A19 Incandescent, F15 Incandescent, C6 Strawberry LED, G12 Razzberry LED, and M5 Mini Ice LED.

For some people, installing decorative lighting on a home has become a passion and/or an art. For those people, light clips are one of the most crucial tools for hanging lights securely and with precision. Some clips (e.g., the multi-purpose grip clips) can be used for many types of lights (e.g., two or more of the lights described above), locations (e.g., gutters, shingles, windows, and/or railings), and/or specific surfaces (e.g., wood, plastic, metal, and/or glass). Other clips are specialty clips designed for a specific type of light, a specific location, and/or a specific surface.

Modern light strings generally include a plurality of "lights" and a "string" (which is actually at least one wire through which power and/or signals may travel). The ends of the string may be connectors (e.g., a plug and a socket) that allow a plurality of strings to be interconnected. The lights are generally evenly spaced along the string, although there may be a "lead" or "extension" at one or both ends. For LED lights, there may be a housing (e.g., a "canister") in which there are appropriate electronics (e.g., a resistor) and a bulb (e.g., a bulb or diode).

GOVEE® RGBIC Permanent Outdoor Lights and GOVEE® Permanent Outdoor Lights Pro (hereinafter "GOVEE® lights" or "GOVEE® light strings") are particularly designed to be installed under the eaves (or other projecting overhang at the edge of a roof) so that the lights project downward on the wall. The surface under the eaves is usually at least substantially horizontal. Like many modern light strings, the GOVEE® lights generally include a plurality of "lights" and a "string" that electrically and physically connects the lights. Each light has a light housing with a first (e.g., upper) surface and a second (e.g., lower) surface. The first surface is separated from the second surface by an annular edge. A light bulb (e.g., LED) projects from one surface (e.g., the lower surface) of the light housing. The GOVEE® lights (including the light housings and the bulb) are generally flatter than other light strings. The string traverses each light housing and extends outward from opposite sides of the annular edge of the light housing.

There appears to be three methods that the GOVEE® light strings can be installed (physically attached under the eaves): (1) using VHB tape (also referred to as "VHB gum"); (2) using VHB tape and string clips; and (3) using a surrounding clip (found examples of which have a surrounding body with slots and screw mount tabs). "VHB" is the initialism for "very high bond."

Using the VHB tape method, the installation steps (not including the preparation steps and electrical connection steps) include the following:

1. Clean surface before installing the light strings;
2. Remove the backing paper to expose the VHB gum; and
3. Press firmly against surface for more than 5 seconds.

One problem with this method is that the VHB tape sometimes fails and the lights fall. Another problem with this method is that, depending on the installation surface, when removing the lights, the VHB tape may cause damage to the surface.

Using the VHB tape and string clips method, the installation steps (not including the preparation steps and electrical connection steps) include the following:

1. Clean surface before installing the light strings;
2. Remove the backing paper to expose the VHB gum;
3. Press firmly against surface for more than 5 seconds; and
4. Attach string clips (also referred to as "screw clips" or "wire clips") to the string. (The "string clips" arch over the string and are screwed in on at least one side of the string.)

In addition to the problems mentioned with regard to the VHB tape method, there is also the problem associated with having additional small clips that are easy to drop and/or lose.

The problems with the VHB tape method and the VHB tape and string clips method have led to the development of surrounding clips. Known surrounding clips include a surrounding body (e.g., a body with an aperture) with slots on opposite sides thereof. The slots are sized to accommodate the string. The surrounding body also has mounting structure (e.g., screw mount tabs). Each screw mount tab has a screw aperture through which a screw may be inserted.

If a surrounding clip is used, there are two methods of installation: installing a clip around pre-installed lights, and installing a clip while installing lights (original installation).

If the GOVEE® light strings are preinstalled using the VHB tape method (or the VHB tape and string clips method), the user may want to provide additional security to prevent the lights from falling or to re-secure already fallen lights. In such a case, a surrounding clip may be used to secure each light. More specifically, the surrounding body of the surrounding clip is positioned around the annular edge of the light housing such that the slots are positioned over the portions of the string extending outward from the light housing (or the portion(s) of the string between adjacent lights). The surrounding clip is then fastened to the surface under the eaves using screws through the screw mount tabs.

The surrounding clip may also be used for an original installation. Because the GOVEE® light strings are positioned between the underside of the eaves (the surface under the eaves) and the surrounding clip, there can be some difficulty with this installation. Some surrounding clips snap onto (or friction fit with) the lights to make installation easier. Using VHB tape can also make installation easier (although, as mentioned above, the VHB tape can cause damage to the surface on which it is attached). But many installations require the juggling of lights, strings, surrounding clips, drills, and screws! Somehow, the lights are positioned between the underside of the eaves (the surface under the eaves), the surrounding clip is positioned around the light, and the surrounding clip is fastened to the surface under the eaves using screws through the screw mount tabs.

If a surrounding clip is used, regardless of whether the GOVEE® light strings are pre-installed or if it is an original installation, the position of the lights sandwiched between the underside of the eaves (the surface under the eaves) and the surrounding clip will result in significant problems if lights (or light strings) need to be removed or replaced. Although the GOVEE® lights are meant to be "permanent" lights, sometimes a bulb needs to be replaced. And sometimes the user wants to make changes (perhaps GOVEE® improves their lights). In such a case, each surrounding clip would have to be removed. This would be a tedious process at best. (And, of course, if the VHB tape was used, it may have caused damage to the surface.)

SUMMARY

Described herein is a bracket for mounting a light. The bracket includes a horizontal surrounding body and an associated vertical mounting base. The surrounding body has a light-supporting aperture defined therein. A string slot is defined in the surrounding body on opposite sides of the light-supporting aperture. The surrounding body is associated with the mounting base such that sides of the mounting base extend beyond sides of the surrounding body.

Some preferred light-supporting apertures are large-radiused light-supporting apertures. Some preferred light-supporting apertures are small-radiused light-supporting apertures.

Some preferred mounting bases have at least one mounting aperture defined therein. Some preferred mounting bases are chuck-optimized mounting bases.

Some preferred brackets are long brackets having an extension between the light-supporting aperture and the mounting base. Some extensions have at least one vent aperture defined therein.

The light may be a light of a light string. The light may have a light housing and a light bulb. A string may traverse the light housing and extend outward from opposite sides of the light housing. When the light is supported within the light-supporting aperture, the string is preferably in respective string slots and the light bulb projects and/or illuminates downward.

An adapter may be used that fits within the light-supporting aperture, and the light may then fit within the adapter.

Objectives, features, combinations, and advantages described and implied herein will be more readily understood upon consideration of the following detailed description of the invention, taken in conjunction with the accompanying drawings. The subject matter described herein is also particularly pointed out and distinctly claimed in the concluding portion of this specification.

DESCRIPTION OF THE DRAWINGS

The accompanying drawings illustrate various exemplary brackets for mounting lights, components of various exemplary brackets for mounting lights, and/or provide teachings by which the various exemplary brackets for mounting lights are more readily understood.

FIG. 57 is a side view of an exemplary set-in adapter.

FIG. 58 is a top view of the exemplary set-in adapter of FIG. 57.

FIG. 59 is a side view of the exemplary set-in adapter of FIG. 57 inserted in a light-supporting aperture of a bracket, a light being supported by the set-in adapter and the bracket.

Figure 1:
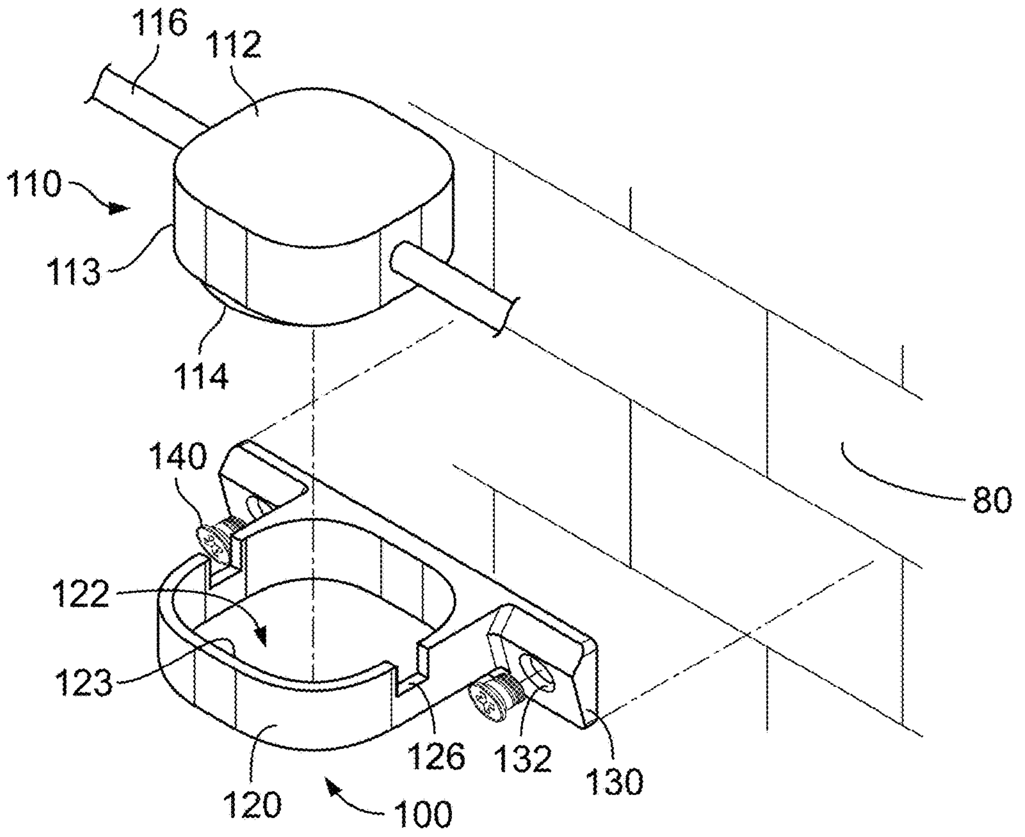
FIG. 1 is an exploded perspective view of a large-radiused ("rounded") light (of a light string), a wall, and an exemplary short bracket with a large-radiused ("rounded") light-supporting aperture.

The figures are not necessarily to scale. Certain features or components herein may be shown in somewhat schematic form and some details of conventional elements may not be shown or described in the interest of clarity and conciseness. The figures are hereby incorporated in and constitute a part of this specification.

DETAILED DESCRIPTION

The known clips described in the Background have many problems. The brackets 100, 100', 200, 300, 400, 500, 600, 700, 800 described herein solve at least some of the known clips' problems. In addition, because the known clips are designed to be installed under the eaves (or other projecting overhang at the edge of a roof), if there are no eaves, it might be difficult or impossible to install the lights so that they are downward projecting.

FIGS. 1-51 show exemplary brackets. FIGS. 52-55 show simplified brackets with variations. FIG. 56 shows simplified mounting base with variation. FIGS. 57-62 show simplified adapters that may be used with the brackets. The variations of FIGS. 52-62 use reference numbers in a 900 series. The reference numbers in the 900 series are used to describe variations and, although similar reference numbers are used, are discussed separately.

Described herein are brackets 100, 100', 200, 300, 400, 500, 600, 700, 800 for mounting lights 110, 210, 310, 410. The brackets all have a surrounding body 120, 120', 220, 320, 420, 520, 620, 720, 820 with a light-supporting aperture 122, 122', 222, 322, 422, 522, 622, 722, 822 defined therein. On the sides of the surrounding body on both sides of the light-supporting aperture is a string slot 126, 126', 226, 326, 426, 526, 626, 726, 826 shaped and sized to accommodate the string 116, 216, 316, 416 (which is actually at least one wire through which power and/or signals may travel). At the rear edge of the surrounding body is at least one mounting base 130, 130', 230, 330, 430, 530, 630, 730, 830 with at least one mounting aperture 132, 132', 232, 332, 432, 532, 632, 732, 832 defined therein through which a connector

140, 140', 240, 340, 440, 540, 640, 740, 840 (e.g., a screw) may be inserted to mount the bracket 100, 100', 200, 300, 400, 500, 600, 700, 800 to a wall 80 (which may be any at least substantially vertical surface).

As will be discussed, if the wall 80 is vertical (parallel to the x-y plane), when installed, the brackets 100, 100', 200, 300, 400, 500, 600, 700, 800 will hold the lights 110, 210, 310, 410 in a horizontal orientation (parallel to the x-z plane). As will be discussed, each surrounding body 120, 120', 220, 320, 420, 520, 620, 720, 820 has a top surface, bottom surface, front edge, rear edge, and two side edges. As will be discussed, each mounting base 130, 130', 230, 330, 430, 530, 630, 730, 830 has a front surface, rear surface, top edge, bottom edge, and two side edges. The rear edge of the surrounding body and the rear surface of the mounting base are closest to the wall 80. The rear edge of the surrounding body is associated with the front surface of the mounting base. The mounting base is preferably wider (side to side) than the surrounding body, such that the side edges of the mounting base extend beyond the side edges of the surrounding body.

The lights 110, 210, 310, 410 shown in FIGS. 1-12 are meant to represent various GOVEE® light strings, but as will be discussed, the brackets may be designed for or adapted to mount other types of lights. As shown, the lights 110, 210, 310, 410 have a light housing 112, 212, 312, 412 with a first (e.g., upper) surface and a second (e.g., lower) surface. The first surface is separated from the second surface by an annular edge 113, 213, 313, 413. A light bulb 114, 214, 314, (e.g., LED) projects from one surface (e.g., the lower surface) of the light housing 112, 212, 312, 412. The second surface (e.g., the upper surface) of the light housing 112, 212, 312, 412 may have a connector (e.g., VHB tape), although the connector is not necessary if a bracket 100, 100', 200, 300, 400, 500, 600, 700, 800 is used to mount the light 110, 210, 310, 410. The string 116, 216, 316, 416 traverses each light housing 112, 212, 312, 412 and extends outward from opposite sides of the annular edge 113, 213, 313, 413 of the light housing.

The string 116, 216, 316, 416 traverses each light housing 112, 212, 312, 412 and extends outward from opposite sides of the annular edge 113, 213, 313, 413 of the light housing.

Exemplary brackets 100, 100', 200, 300, 400, 500, 600, 700, 800 may be better understood with reference to the drawings, but these brackets are not intended to be of a limiting nature. The same reference numbers are used throughout the drawings and description in this document to refer to the same or like parts. Groupings of figures use the same "series" numbers (e.g., FIGS. 1-3 use the 100 series, FIGS. 4-6 use the 200 series, FIGS. 7-9 use the 300 series, and FIGS. 10-12 use the 400 series). Similar components in the different series, however, use the same last two digits (e.g., the light is referred to by reference number "_10," the surrounding body is referred to by reference number "__20," the mounting base is referred to by reference number "__30," the connector is referred to by reference number "__40"). Unless specified otherwise, the shown shapes and relative dimensions are preferred, but are not meant to be limiting unless specifically claimed, in which case they may limit the scope of that particular claim.

Brackets—FIGS. 1-47:

FIGS. 1-12 show exemplary brackets 100, 200, 300, 400 and exemplary lights 110, 210, 310, 410 prior to and after installation against a wall 80.

Figure 2:
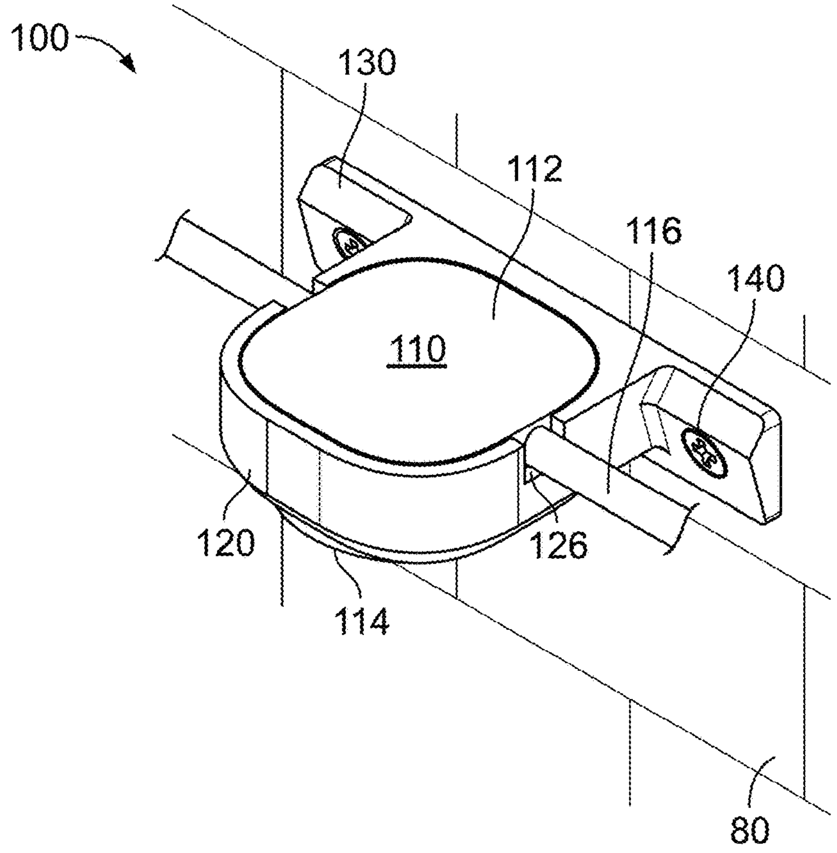
FIG. 2 is a perspective view of the bracket of FIG. 1 attached to the wall with the light of FIG. 1 installed therein.
Figure 3:
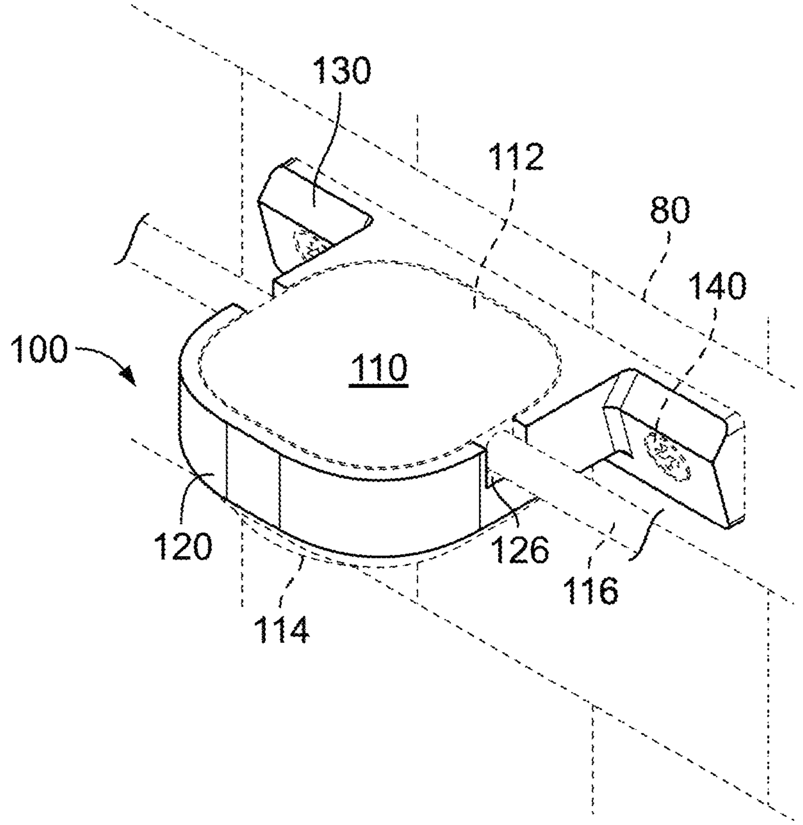
FIG. 3 is a perspective view of the bracket of FIG. 1, with the wall and light shown in dashed lines.

FIGS. 1-3 show a short bracket 100 for mounting a large-radiused ("rounded") light 110. The bracket has a surrounding body 120 with a large-radiused ("rounded") light-supporting aperture 122 defined therein. When the light 110 is positioned within the light-supporting aperture 122, the inner annular aperture surface 123 is shown as being substantially coextensive with the annular edge 113 of the light 110. A string slot 126 is defined in the surrounding body 120 on both sides of the light-supporting aperture 122. Further, when the light 110 is positioned within the light-supporting aperture 122, the string 116 (on either side of the light 110) is aligned with and positioned within the respective string slot 126 (on either side of the aperture 122). At the rear edge of the surrounding body 120 is a mounting base 130. The shown mounting base 130 (depicted as a chuck-optimized mounting base) is associated with the rear edge of the surrounding body 120 with the ends of the mounting base 130 extending past both sides of the surrounding body 120. As shown, there is a mounting aperture 132 defined through (front to rear) the ends of the mounting base 130. As shown, when the bracket 100 is attached to the wall 80 (e.g., by screwing a screw 140 through a mounting aperture 132 of the mounting base 130 and into the wall 80), the surrounding body 120 projects outward therefrom. (Put another way, the planar surrounding body 120 is at least substantially perpendicular to the planar mounting base 130 such that they form a three-dimensional, non-planar device.) Then, when the light 110 is positioned within the light-supporting aperture 122, the illumination from the light bulb 114 projects downward, illuminating at least part of the wall 80.

Figure 4:
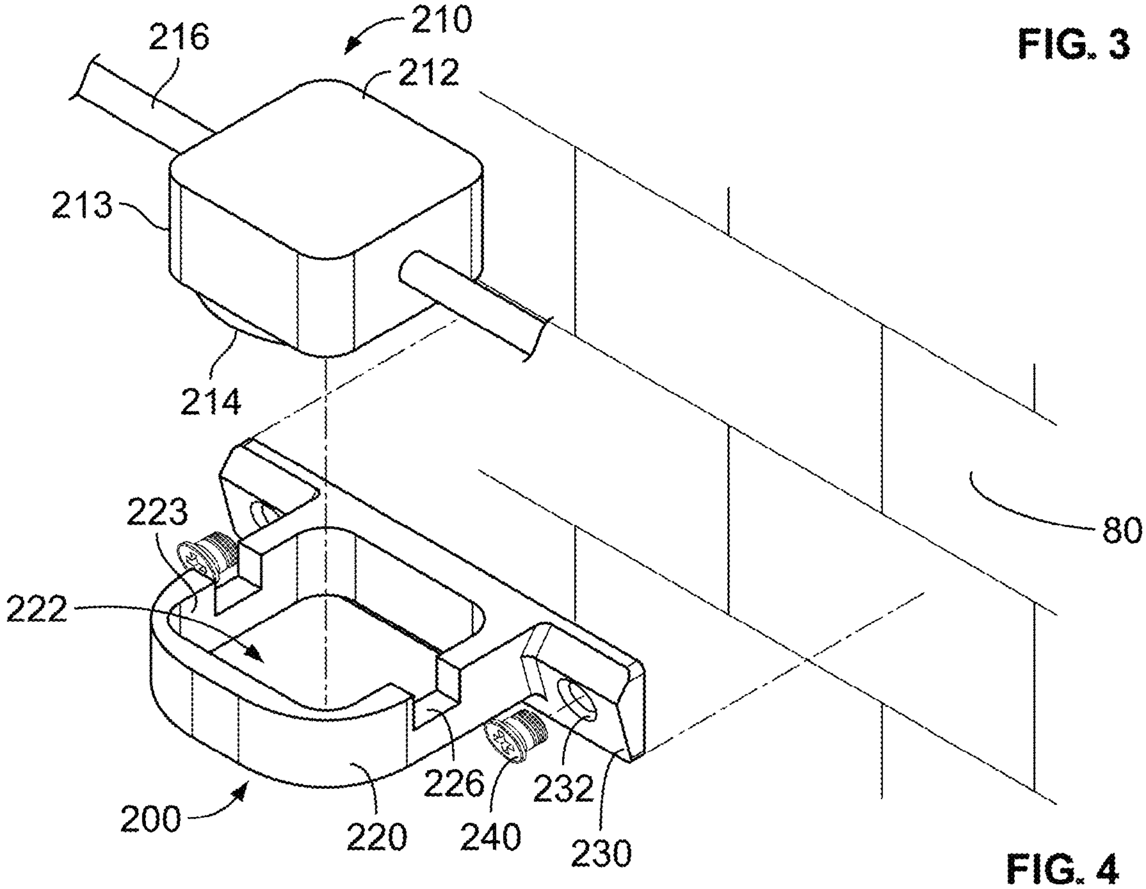
FIG. 4 is an exploded perspective view of a small-radiused ("squared") light (of a light string), a wall, and an exemplary short bracket with a small-radiused ("squared") light-supporting aperture.
Figure 5:
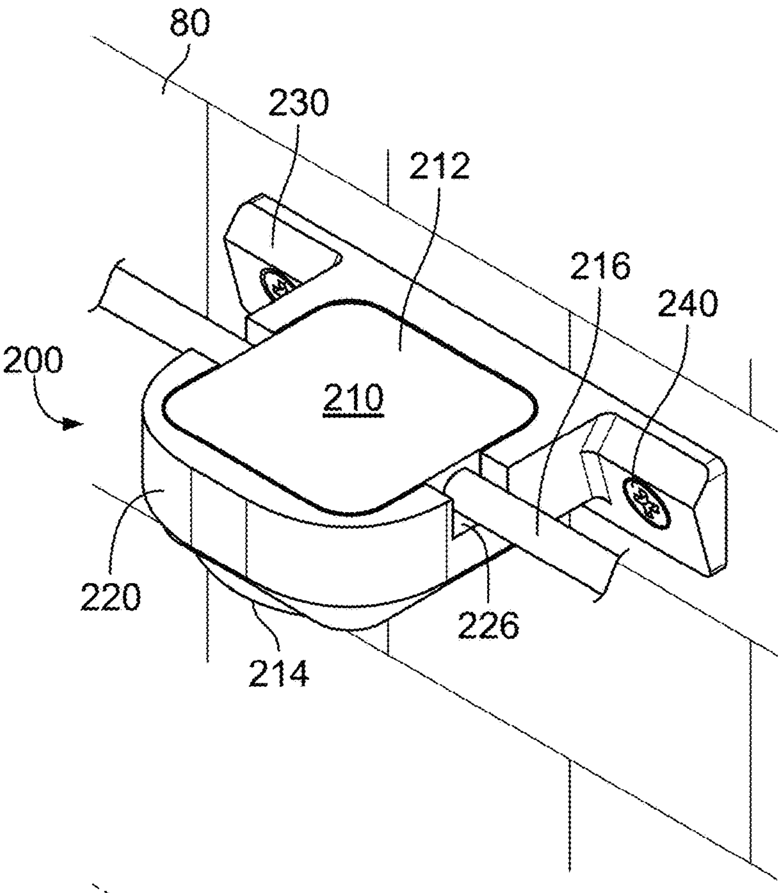
FIG. 5 is a perspective view of the bracket of FIG. 4 attached to the wall with the light of FIG. 4 installed therein.
Figure 6:
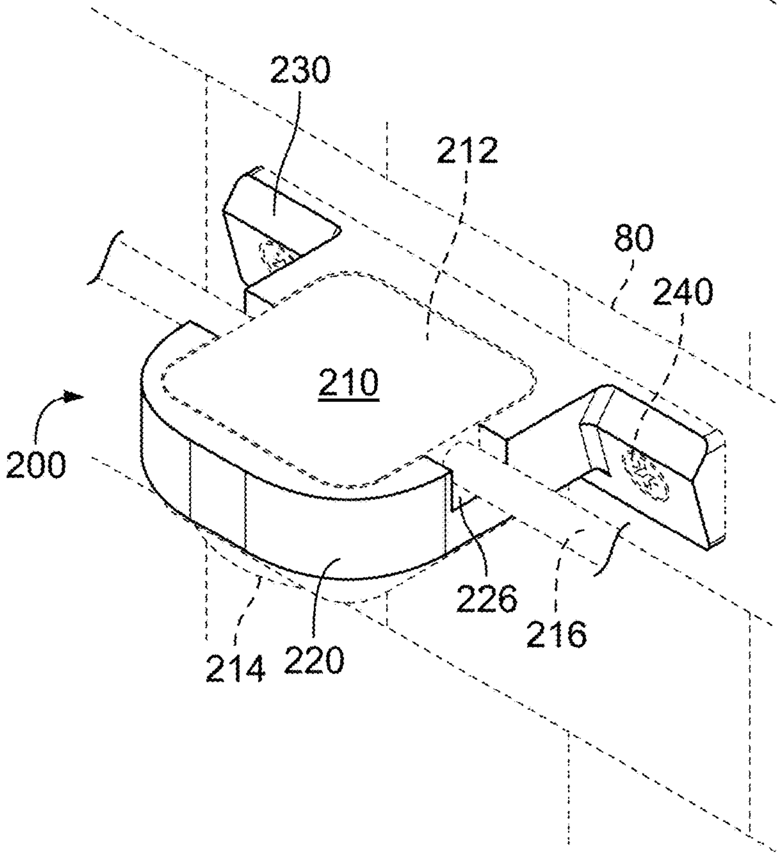
FIG. 6 is a perspective view of the bracket of FIG. 4, with the wall and light shown in dashed lines.

FIGS. 4-6 show a short bracket 200 for mounting a small-radiused ("squared") light 210. The bracket has a surrounding body 220 with a small-radiused ("squared") light-supporting aperture 222 defined therein. When the light 210 is positioned within the light-supporting aperture 222, the inner annular aperture surface 223 is shown as being substantially coextensive with the annular edge 213 of the light 210. A string slot 226 is defined in the surrounding body 220 on both sides of the light-supporting aperture 222. Further, when the light 210 is positioned within the light-supporting aperture 222, the string 216 (on either side of the light 210) is aligned with and positioned within the respective string slot 226 (on either side of the aperture 222). At the rear edge of the surrounding body 220 is a mounting base 230. The shown mounting base 230 (depicted as a chuck-optimized mounting base) is associated with the rear edge of the surrounding body 220 with the ends of the mounting base 230 extending past both sides of the surrounding body 220. As shown, there is a mounting aperture 232 defined through (front to rear) the ends of the mounting base 230. As shown, when the bracket 200 is attached to the wall 80 (e.g., by screwing a screw 240 through a mounting aperture 232 of the mounting base 230 and into the wall 80), the surrounding body 220 projects outward therefrom. (Put another way, the planar surrounding body 220 is at least substantially perpendicular to the planar mounting base 230 such that they form a three-dimensional, non-planar device.) Then, when the light 210 is positioned within the light-supporting aperture 222, the illumination from the light bulb 214 projects downward, illuminating at least part of the wall 80.

Figure 7:
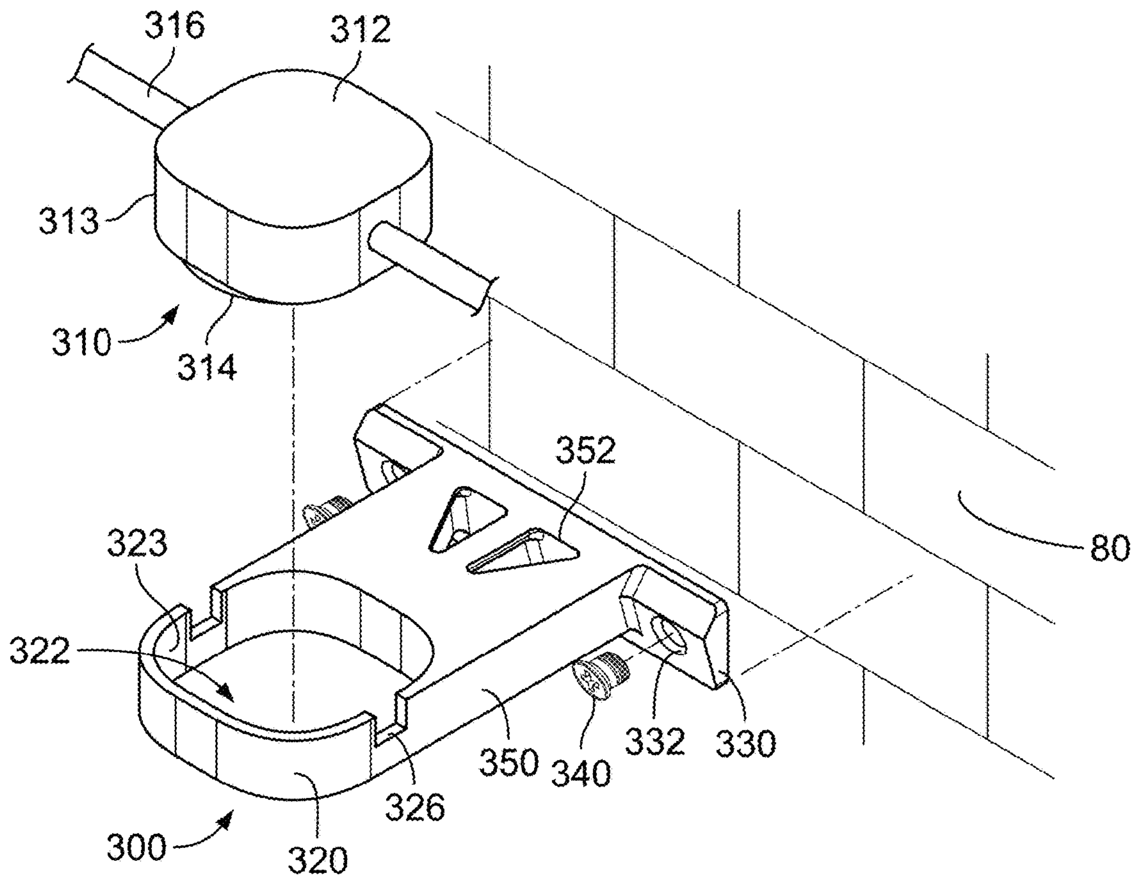
FIG. 7 is an exploded perspective view of a large-radiused ("rounded") light (of a light string), a wall, and an exemplary long bracket with a large-radiused ("rounded") light-supporting aperture, the extension having vent apertures defined therein.
Figure 8:
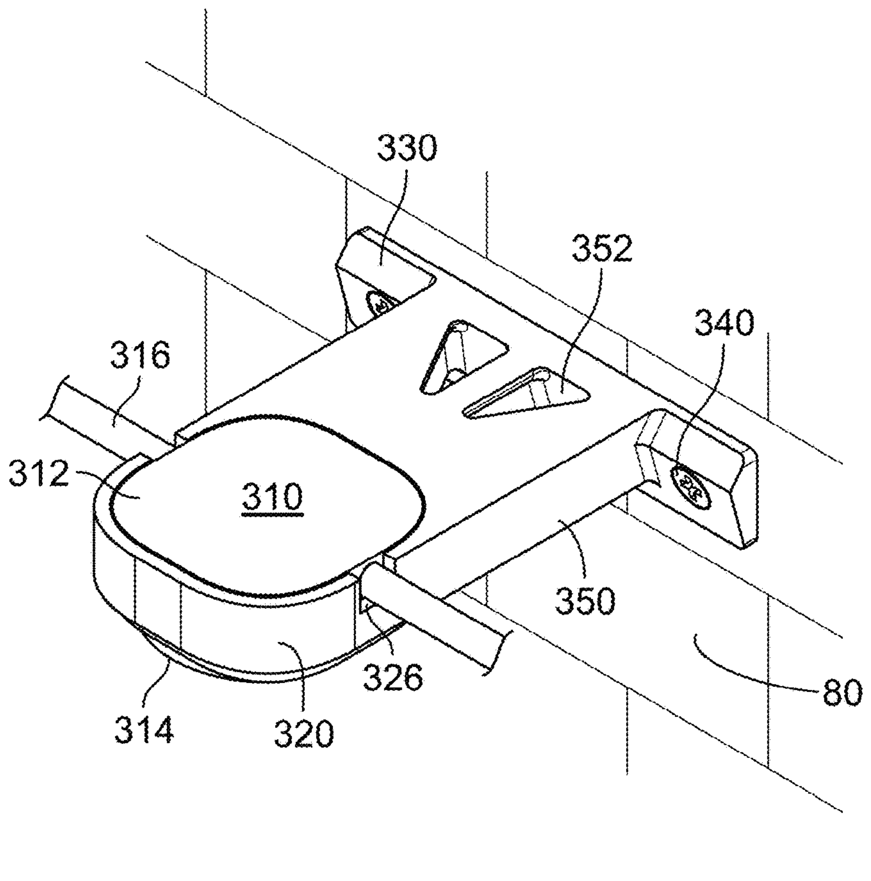
FIG. 8 is a perspective view of the bracket of FIG. 7 attached to the wall with the light of FIG. 7 installed therein.
Figure 9:
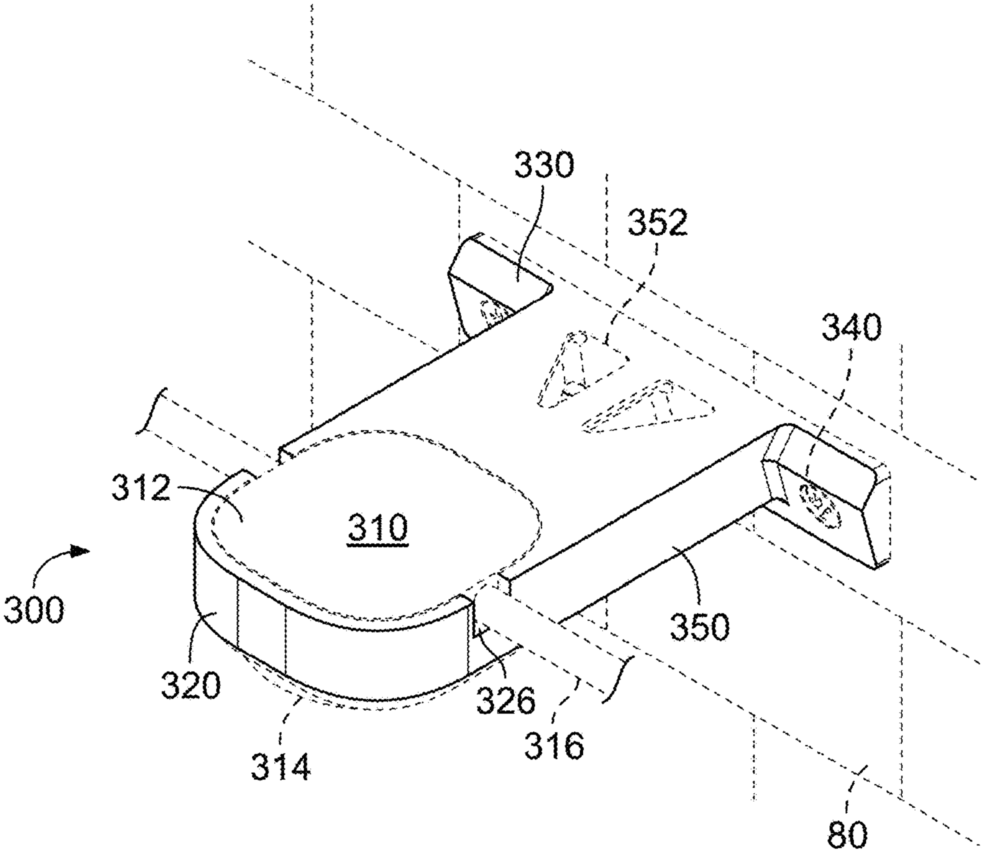
FIG. 9 is a perspective view of the bracket of FIG. 7, with the wall and light shown in dashed lines.

FIGS. 7-9 show a long bracket 300 for mounting a large-radiused ("rounded") light 310. The bracket has a surrounding body 320 with a large-radiused ("rounded") light-supporting aperture 322 defined therein. A string slot 326 is defined in the surrounding body 320 on both sides of the light-supporting aperture 322. The surrounding body 320 also has an extension 350 (which is what makes the bracket long and positions the light 310 farther from the wall 80), and the extension 350 has optional vent apertures 352 defined therein. (Although not shown in these figures, the extension may include bracing to strengthen the bracket 300 without adding as much to the weight and material cost as a solid extension would add. A solid extension, however, could also be used.) When the light 310 is positioned within the light-supporting aperture 322, the inner annular aperture surface 323 is shown as being substantially coextensive with the annular edge 313 of the light 310. Further, when the light 310 is positioned within the light-supporting aperture 322, the string 316 (on either side of the light 310) is aligned with and positioned within the respective string slot 326 (on either side of the aperture 322). At the rear edge of the surrounding body 320 is a mounting base 330. The shown mounting base 330 (depicted as a chuck-optimized mounting base) is associated with the rear edge of the surrounding body 320 with the ends of the mounting base 330 extending past both sides of the surrounding body 320. As shown, there is a mounting aperture 332 defined through (front to rear) the ends of the mounting base 330. As shown, when the bracket 300 is attached to the wall 80 (e.g., by screwing a screw 340 through a mounting aperture 332 of the mounting base 330 and into the wall 80), the surrounding body 320 projects outward therefrom. (Put another way, the planar surrounding body 320 is at least substantially perpendicular to the planar mounting base 330 such that they form a three-dimensional, non-planar device.) Then, when the light 310 is positioned within the light-supporting aperture 322, the illumination from the light bulb 314 projects downward, illuminating at least part of the wall 80.

Figure 10:
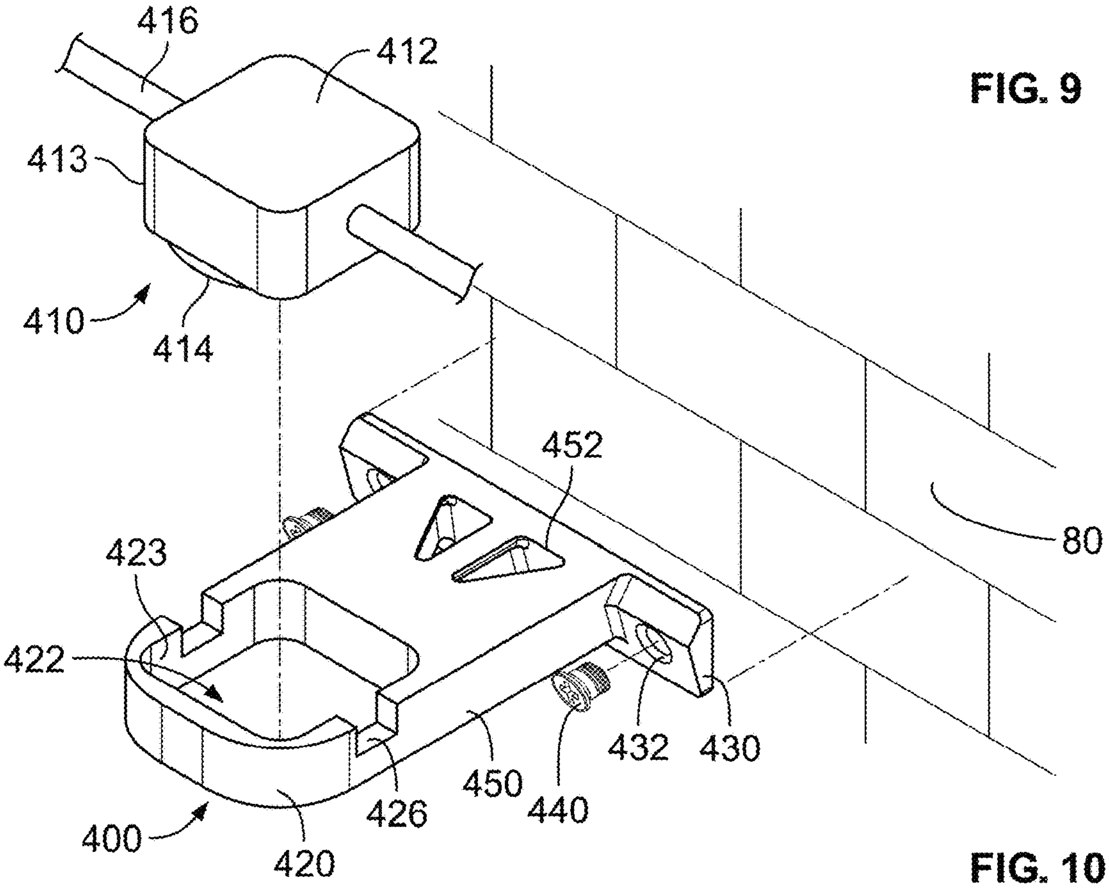
FIG. 10 is an exploded perspective view of a small-radiused ("squared") light (of a light string), a wall, and an exemplary long bracket with a small-radiused ("squared") light-supporting aperture, the extension having vent apertures defined therein.
Figure 11:
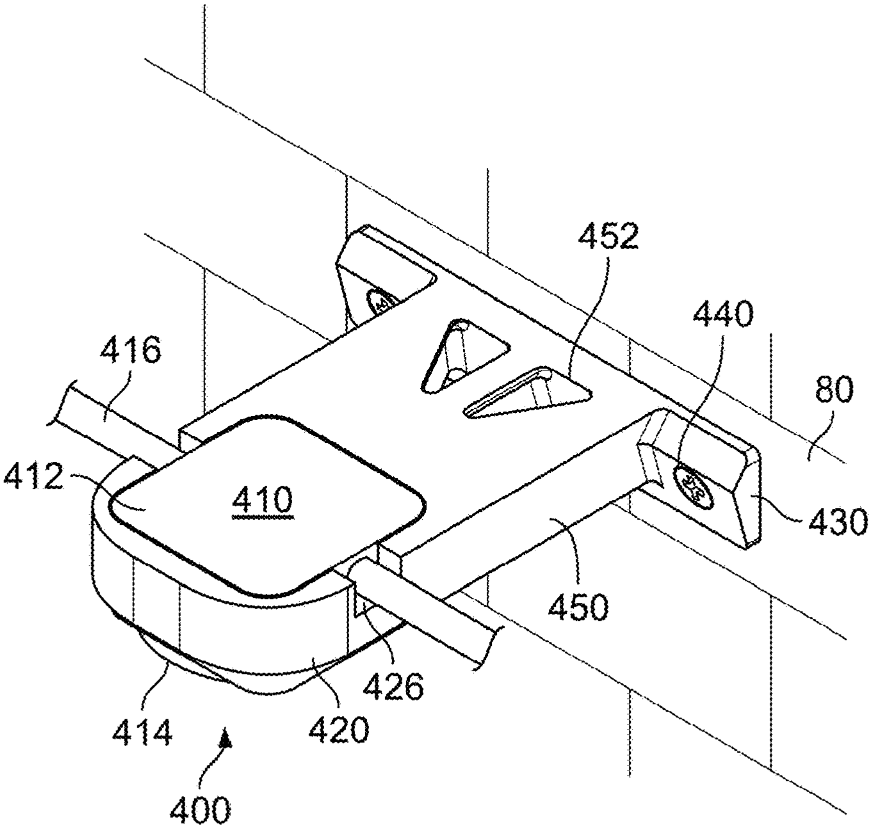
FIG. 11 is a perspective view of the bracket of FIG. 10 attached to the wall with the light of FIG. 10 installed therein.
Figure 12:
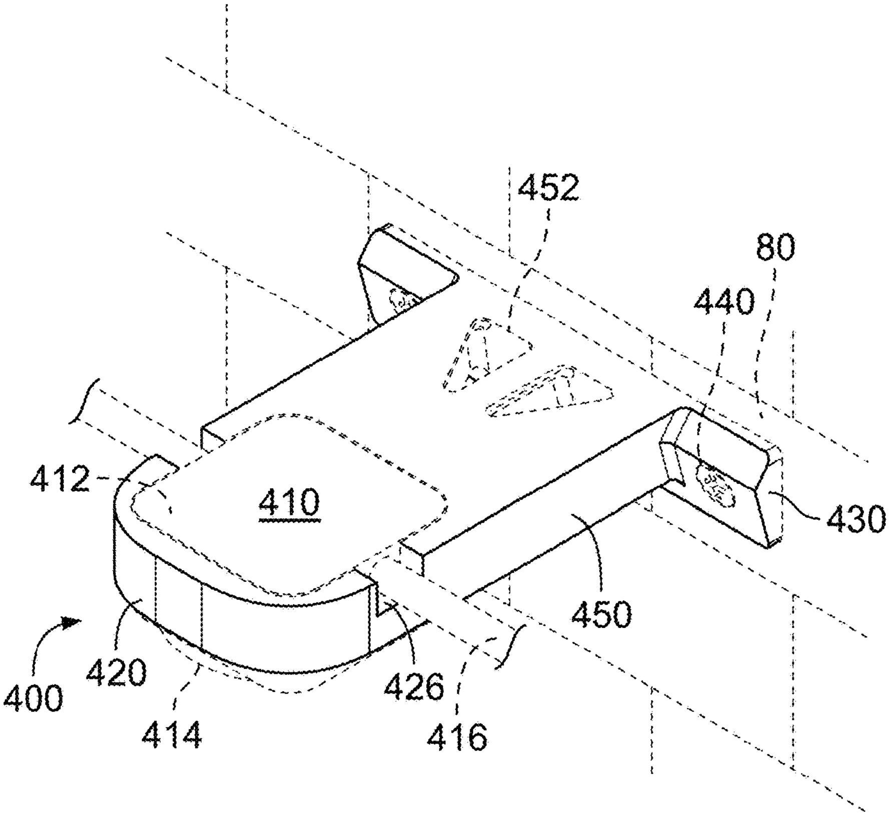
FIG. 12 is a perspective view of the bracket of FIG. 10, with the wall and light shown in dashed lines.
Figure 13:
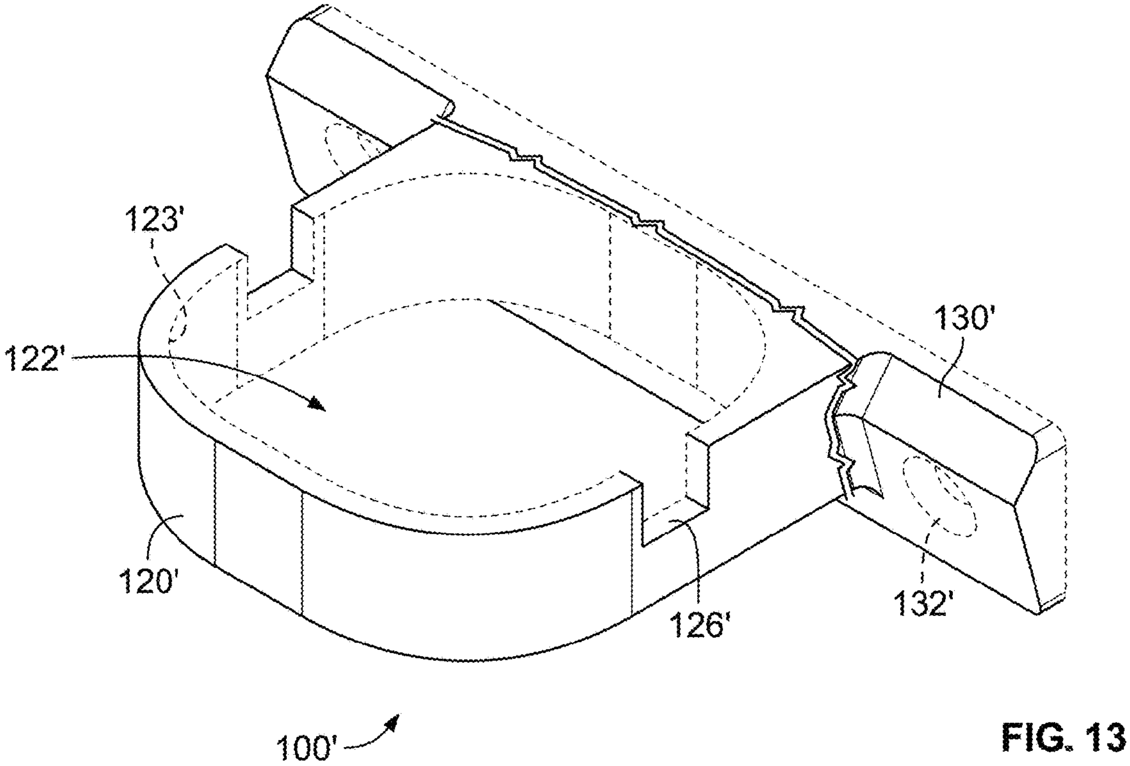
FIG. 13 is a top isometric view of an exemplary generic bracket for mounting lights, the bracket may be any length (e.g., long or short) and have a light-supporting aperture of any shape (e.g., "rounded" or "squared"), the mounting base being a chuck-optimized mounting base.
Figure 14:
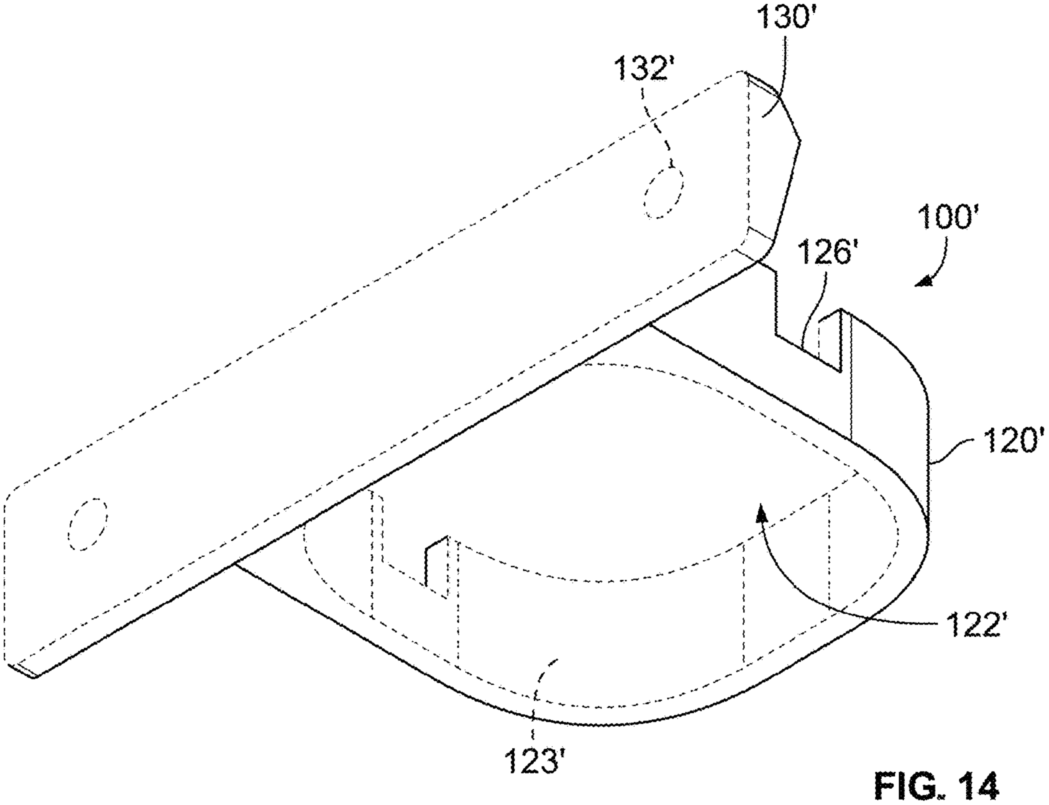
FIG. 14 is a bottom isometric view of the bracket of FIG. 13.
Figure 15:
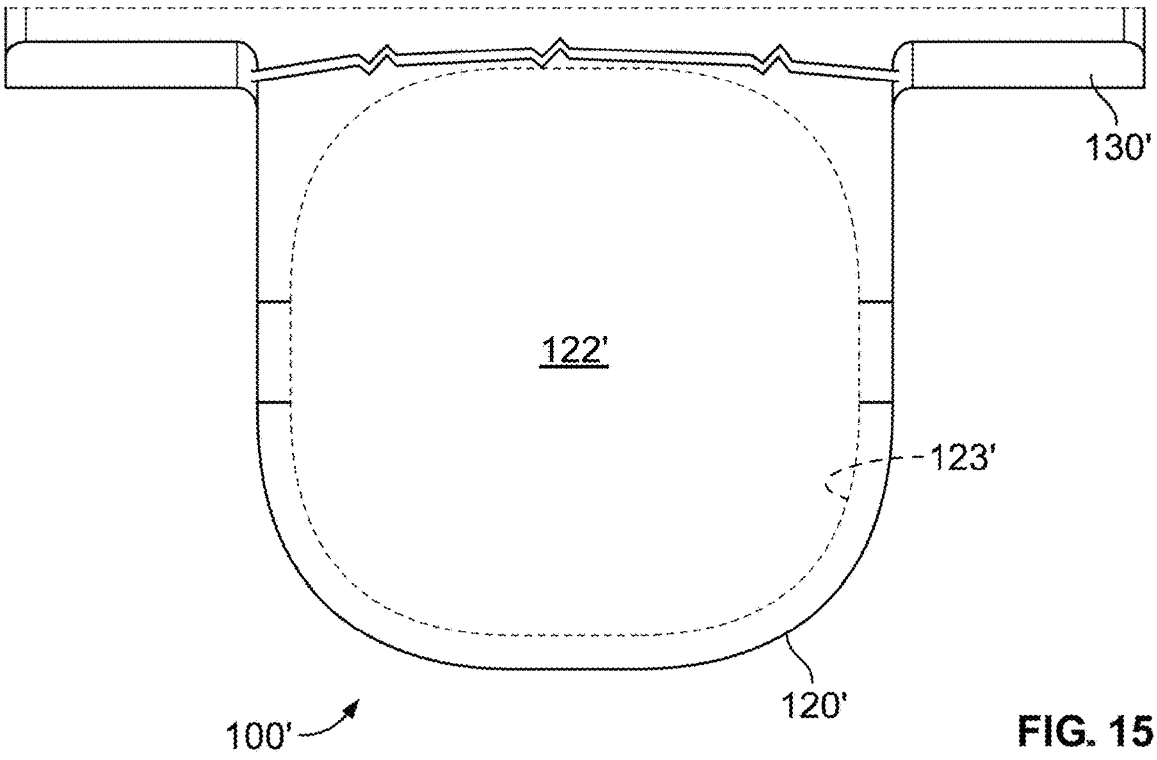
FIG. 15 is a top plan view of the bracket of FIG. 13.
Figure 16:
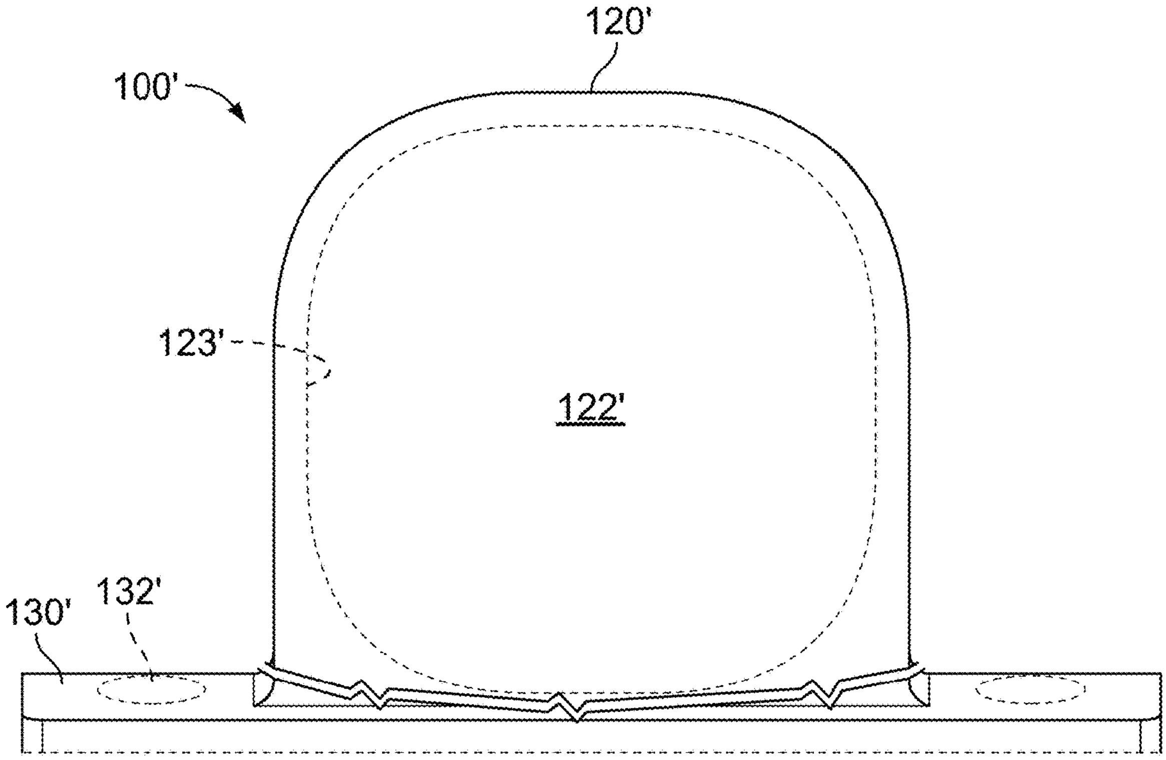
FIG. 16 is a bottom plan view of the bracket of FIG. 13.
Figure 17:
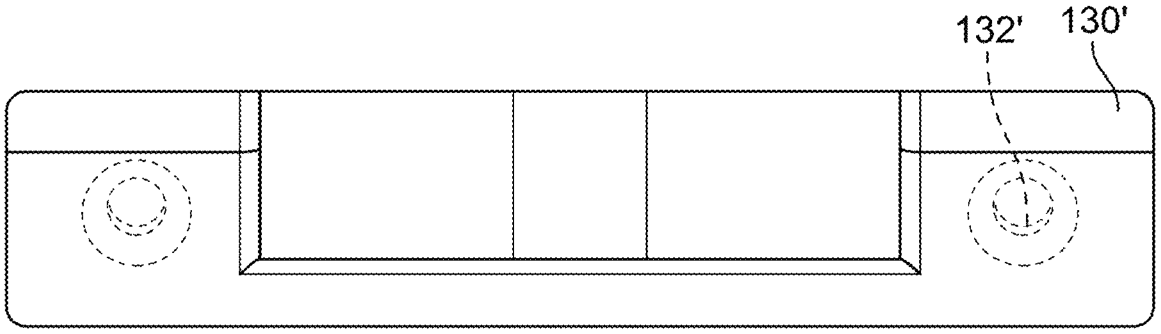
FIG. 17 is a front view of the bracket of FIG. 13.
Figure 18:
FIG. 18 is a rear view of the bracket of FIG. 13.
Figure 19:
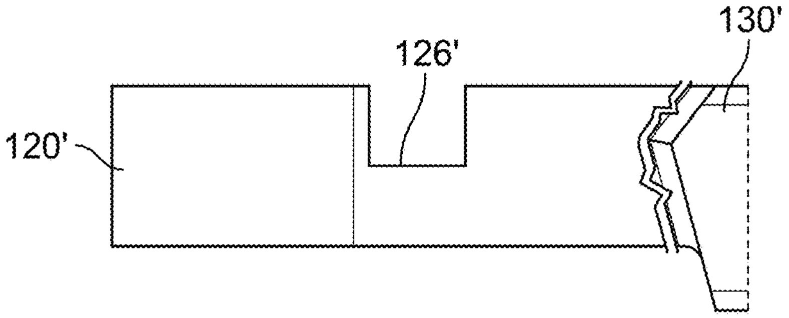
FIG. 19 is a side view of the bracket of FIG. 13, the opposite view being identical.
Figure 20:
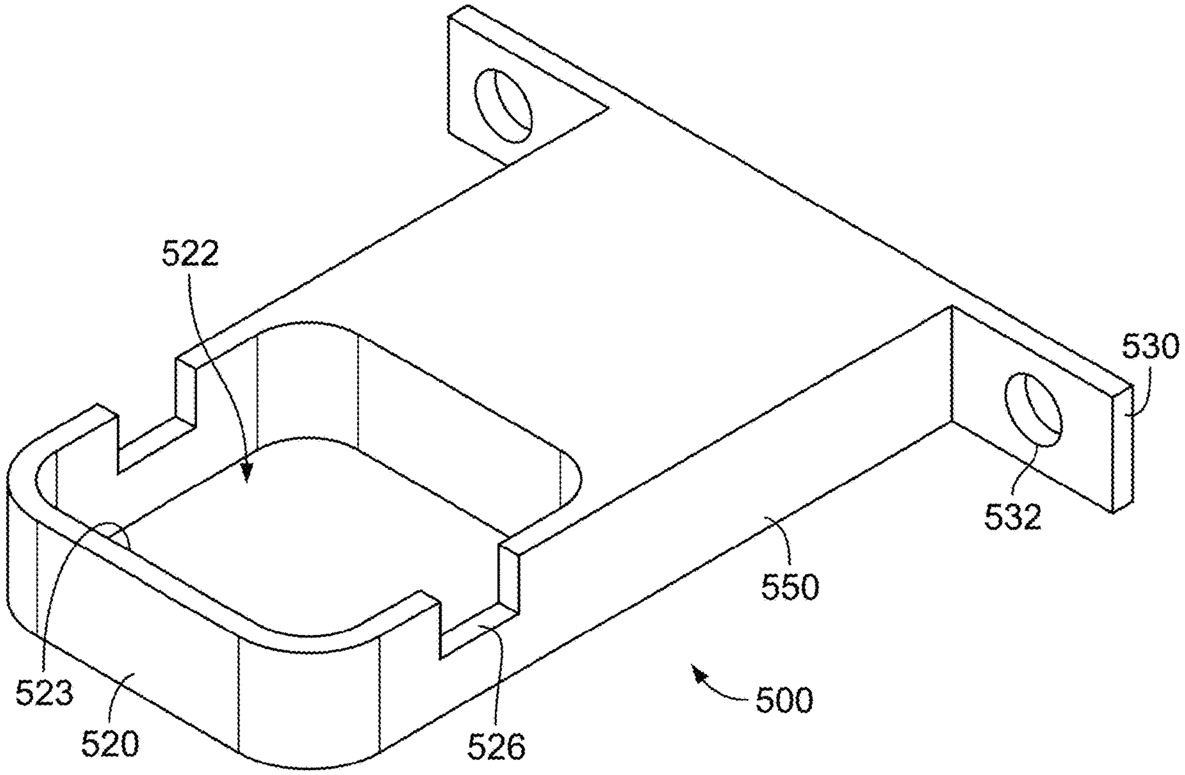
FIG. 20 is a top isometric view of an exemplary long bracket for mounting lights with a small-radiused ("squared") light-supporting aperture, the upper surface of the extension being solid.
Figure 21:
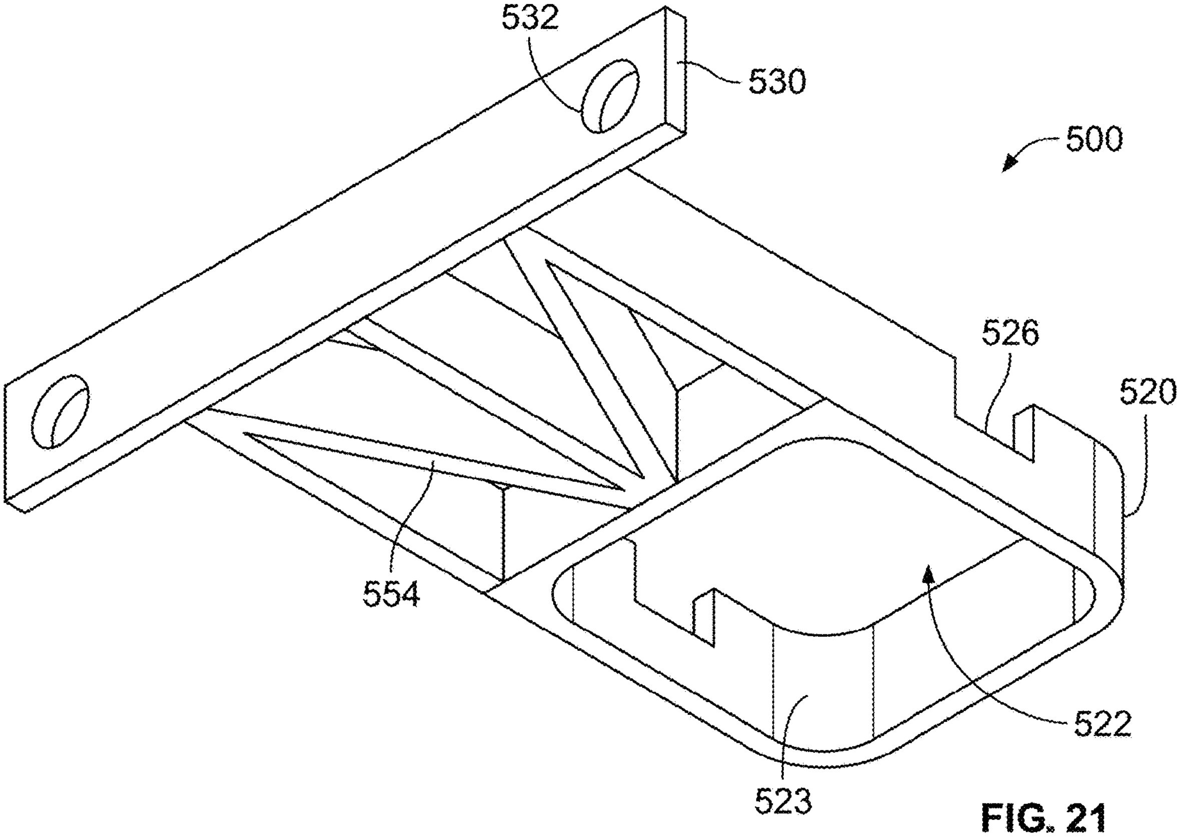
FIG. 21 is a bottom isometric view of the bracket of FIG. 20.
Figure 22:
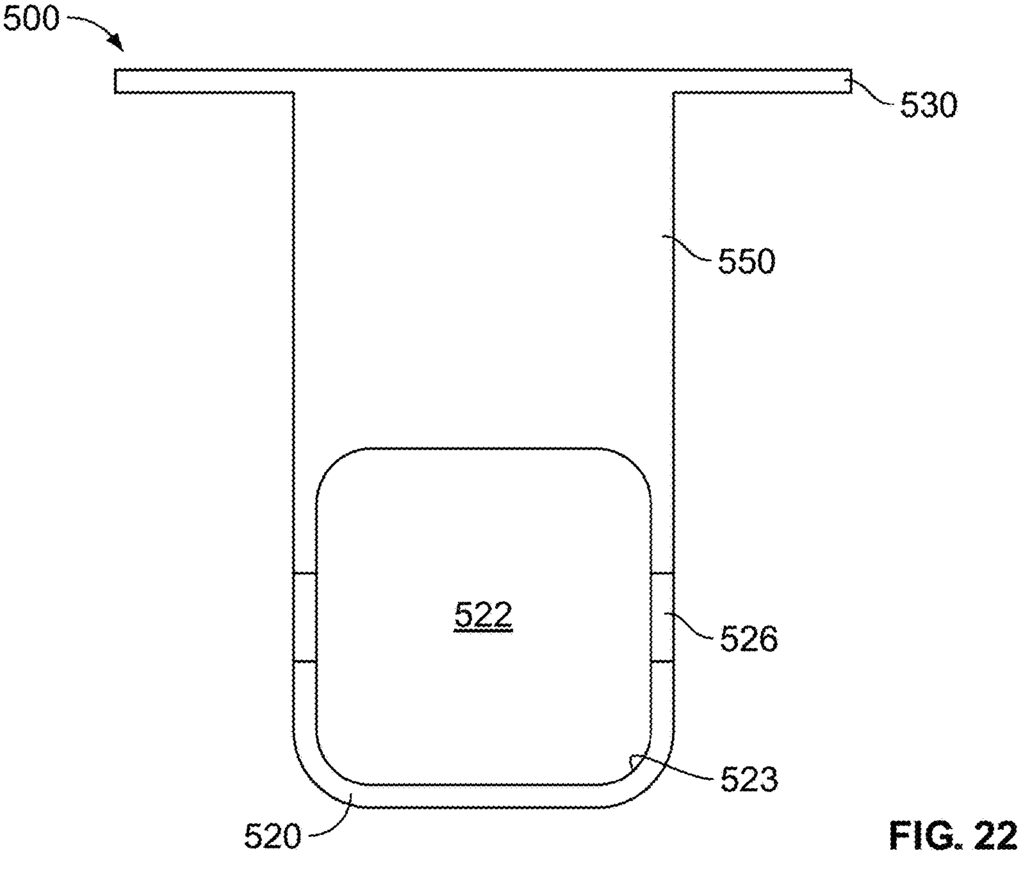
FIG. 22 is a top plan view of the bracket of FIG. 20.
Figure 23:
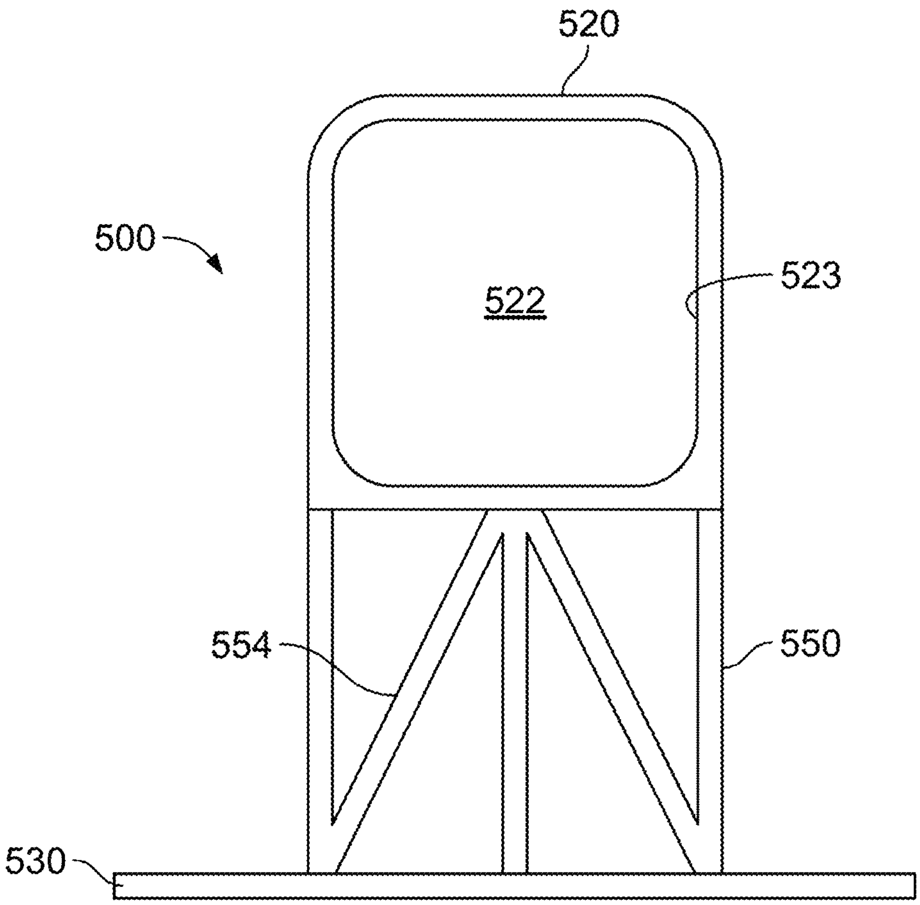
FIG. 23 is a bottom plan view of the bracket of FIG. 20.
Figure 24:
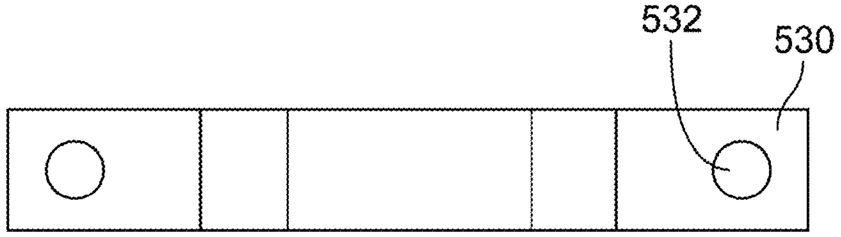
FIG. 24 is a front view of the bracket of FIG. 20.
Figure 25:
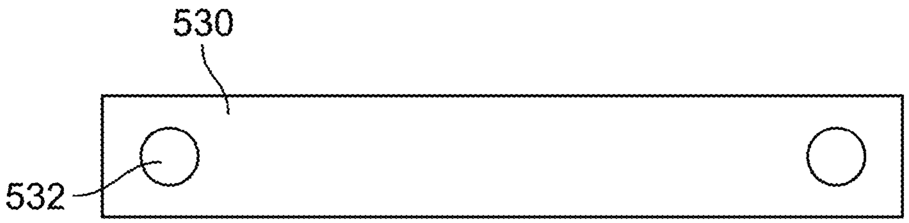
FIG. 25 is a rear view of the bracket of FIG. 20.
Figure 26:
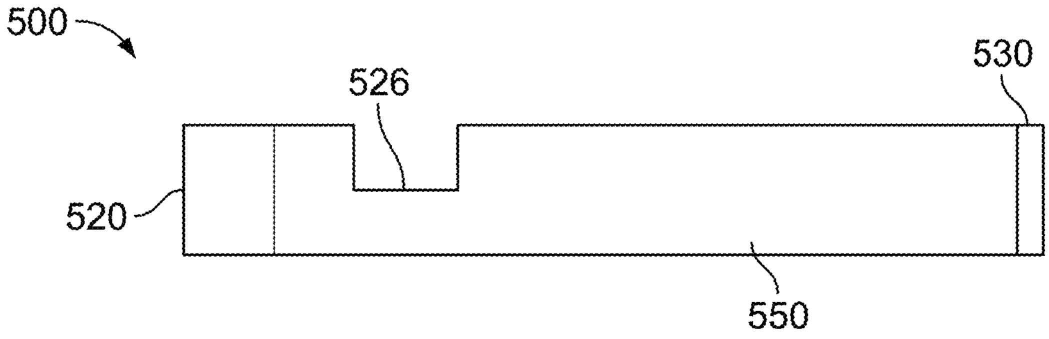
FIG. 26 is a side view of the bracket of FIG. 20, the opposite view being identical.
Figure 27:
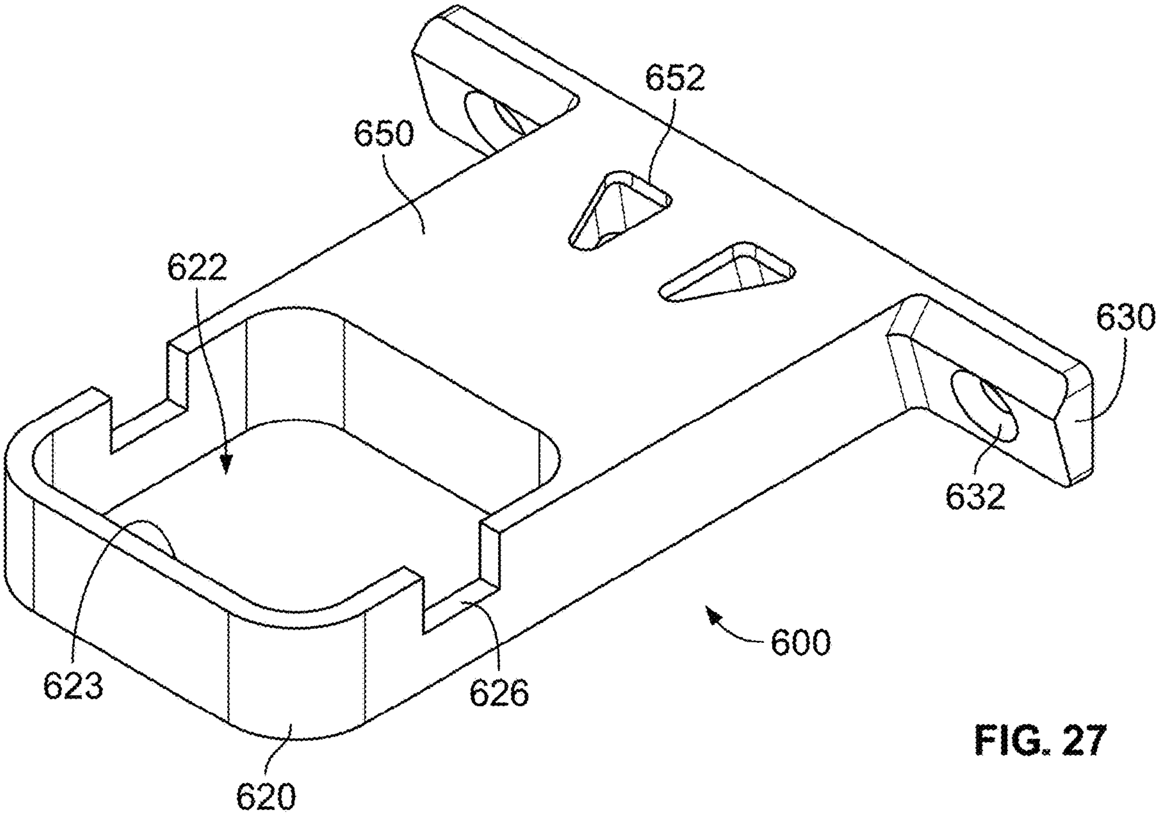
FIG. 27 is a top isometric view of an exemplary long bracket for mounting lights with a small-radiused ("squared") light-supporting aperture, the extension having vent apertures defined therein, the mounting base being a chuck-optimized mounting base.
Figure 28:
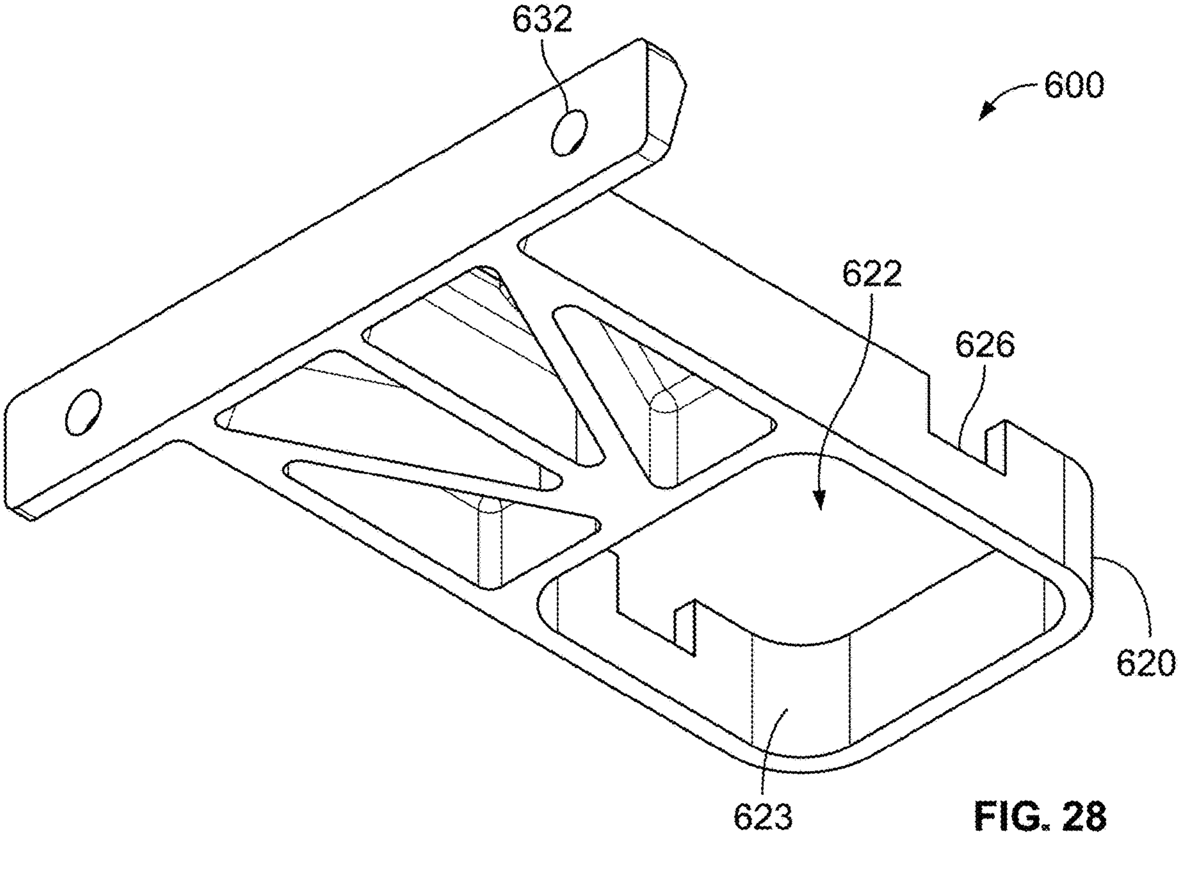
FIG. 28 is a bottom isometric view of the bracket of FIG. 27.
Figure 29:
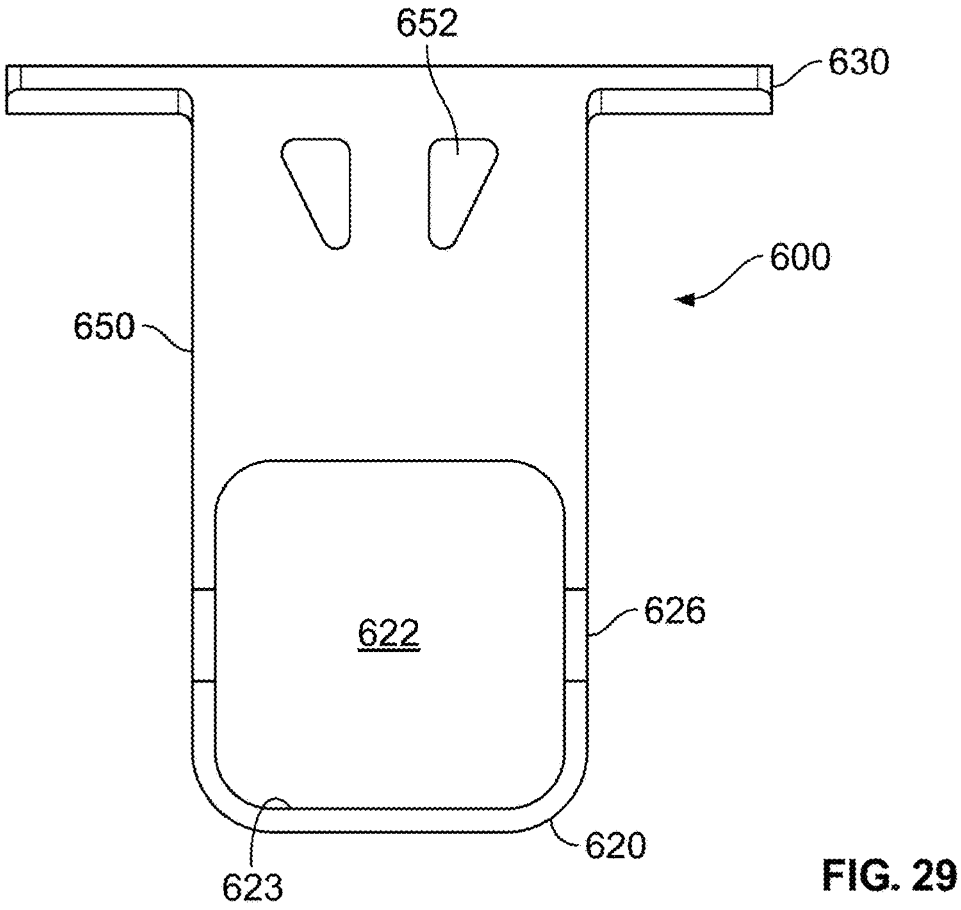
FIG. 29 is a top plan view of the bracket of FIG. 27.
Figure 30:
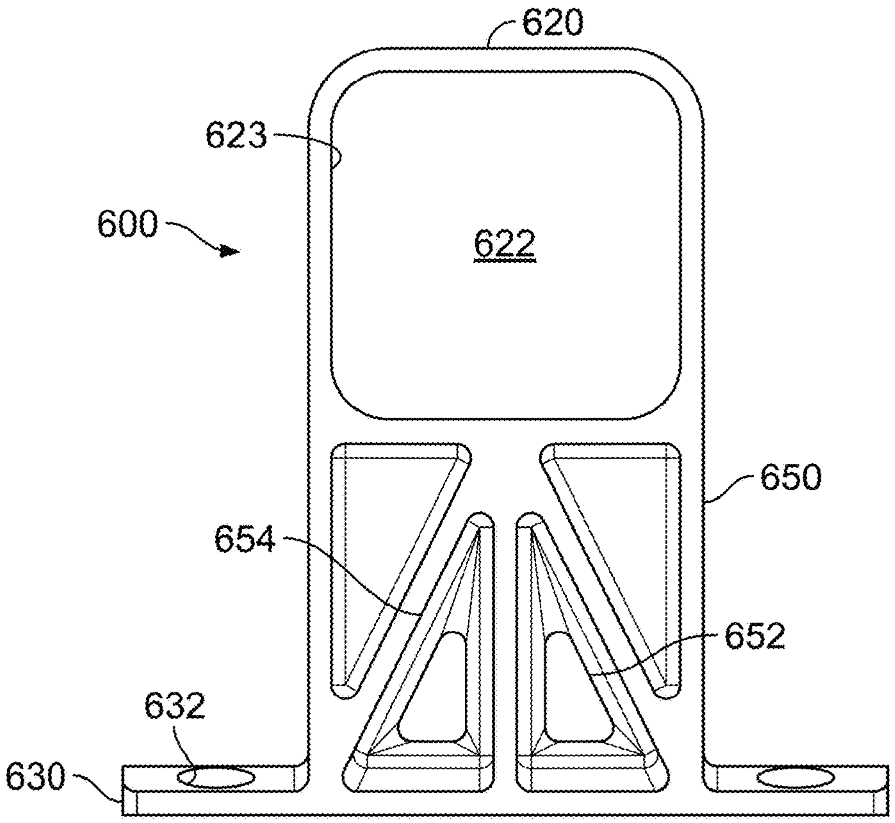
FIG. 30 is a bottom plan view of the bracket of FIG. 27.
Figure 31:
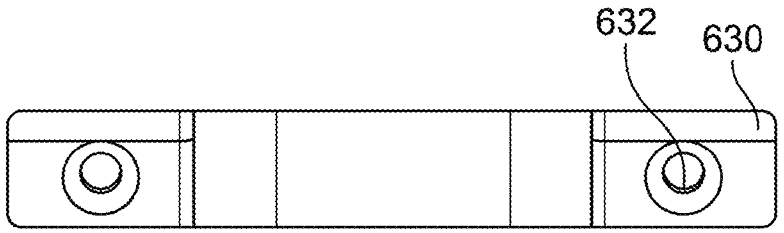
FIG. 31 is a front view of the bracket of FIG. 27.
Figure 32:
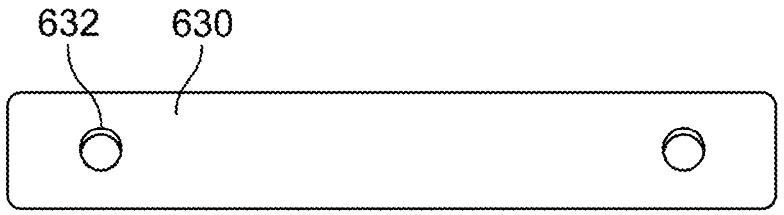
FIG. 32 is a rear view of the bracket of FIG. 27.
Figure 33:
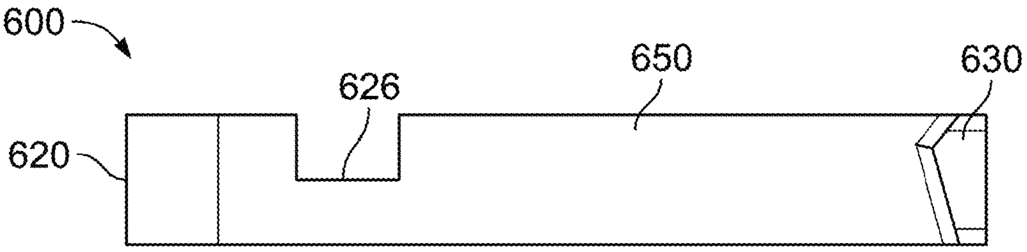
FIG. 33 is a side view of the bracket of FIG. 27, the opposite view being identical.
Figure 34:
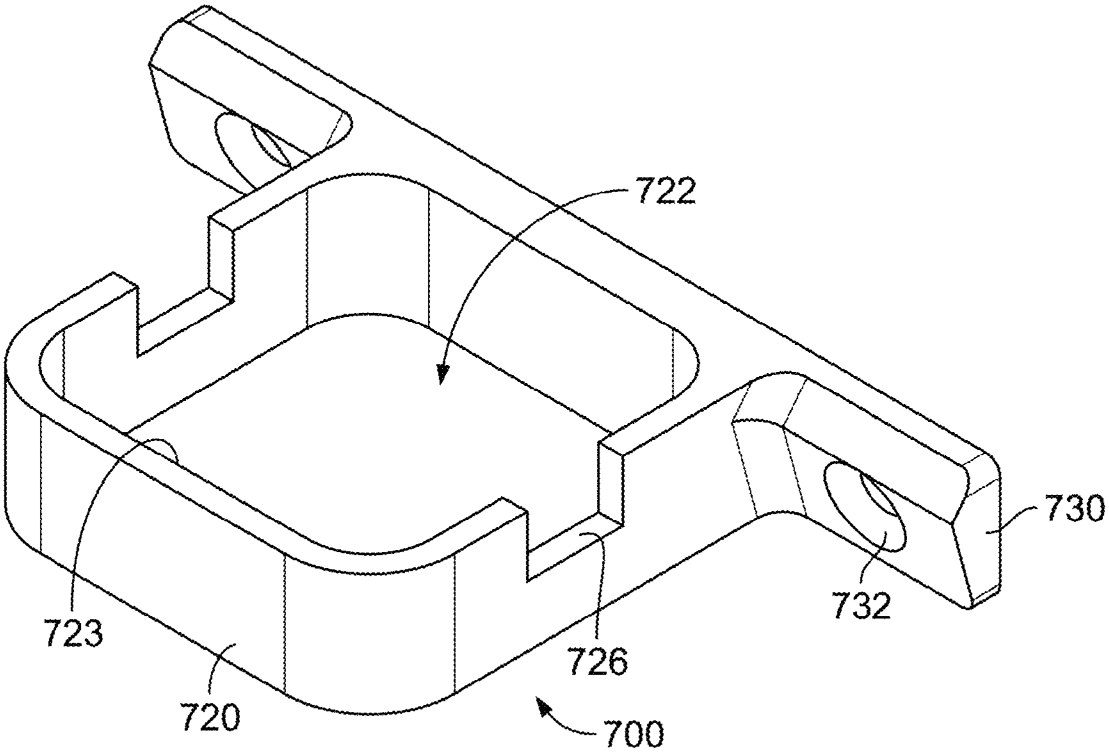
FIG. 34 is a top isometric view of an exemplary short bracket for mounting lights with a small-radiused ("squared") light-supporting aperture, the mounting base being a chuck-optimized mounting base.
Figure 35:
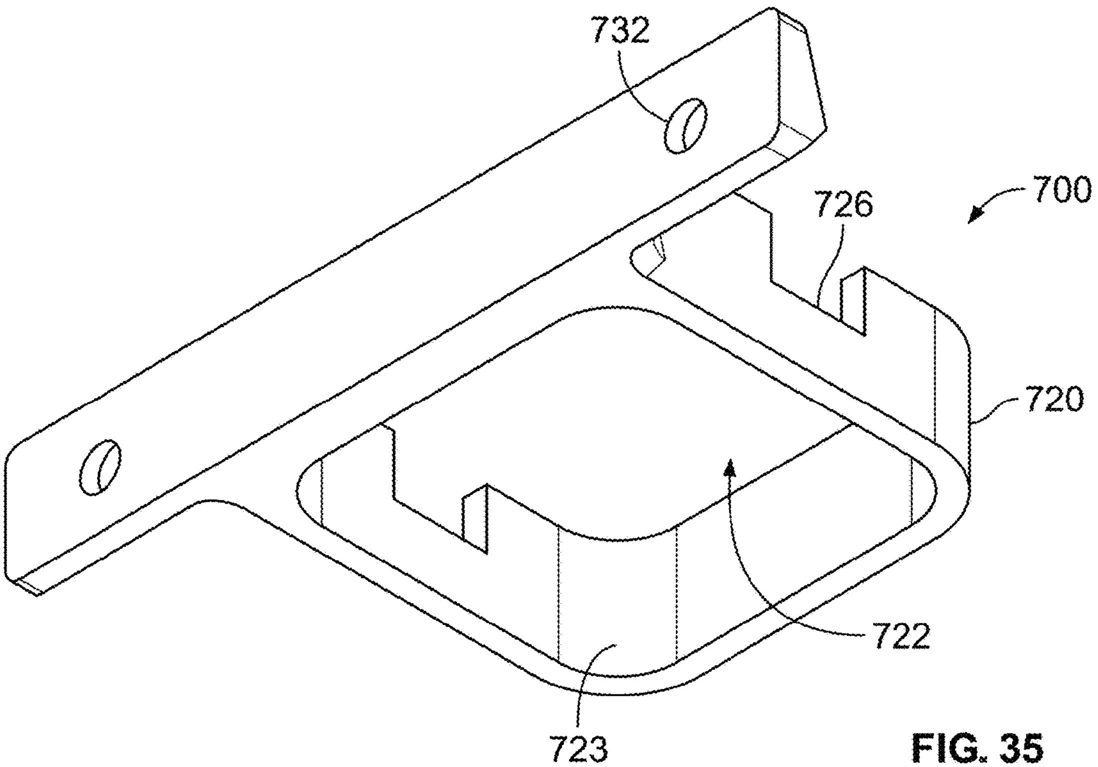
FIG. 35 is a bottom isometric view of the bracket of FIG. 34.
Figure 36:
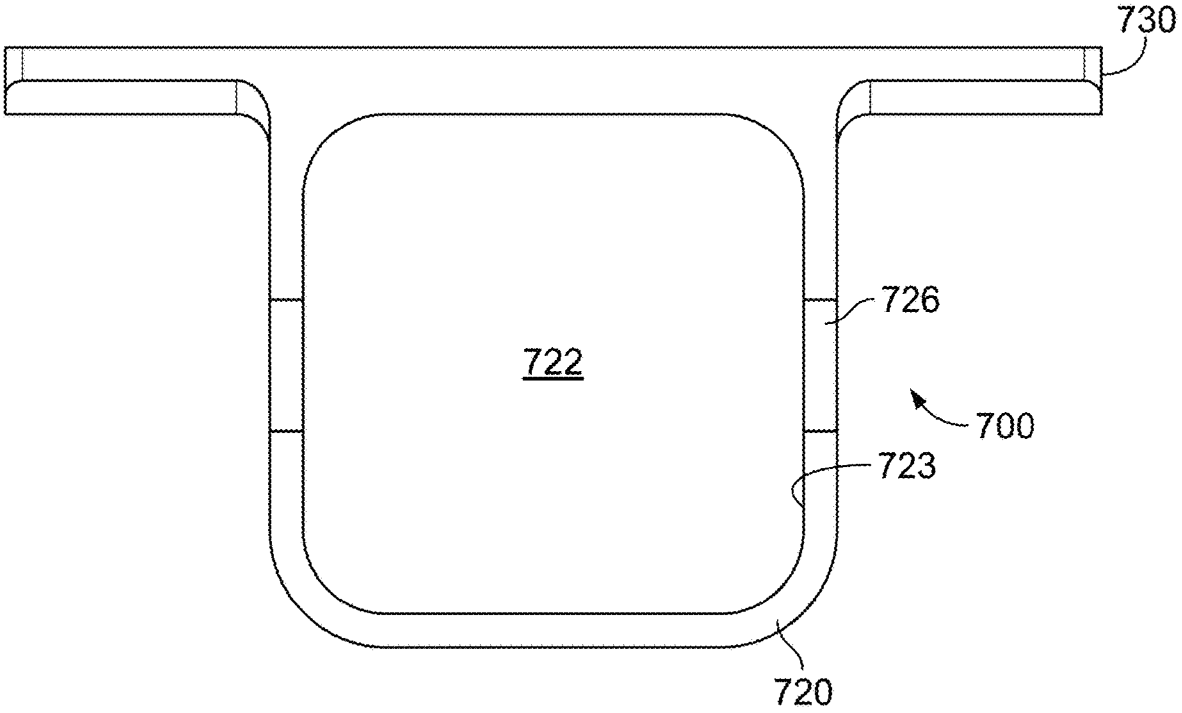
FIG. 36 is a top plan view of the bracket of FIG. 34.
Figure 37:
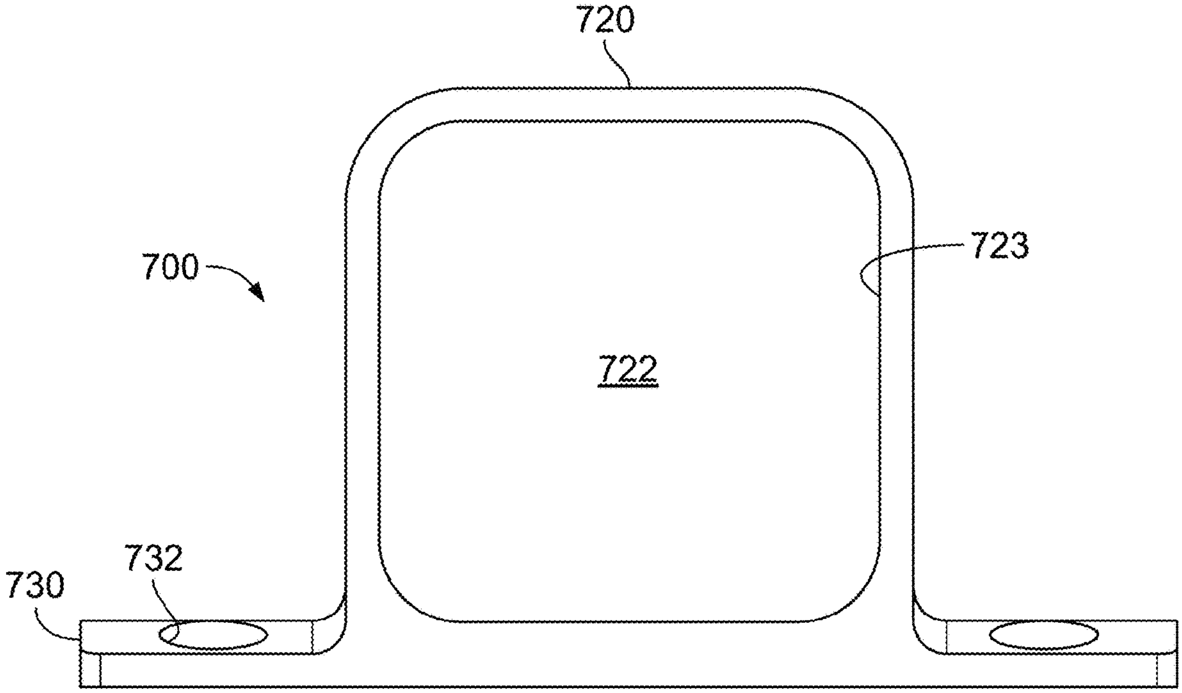
FIG. 37 is a bottom plan view of the bracket of FIG. 34.
Figure 38:
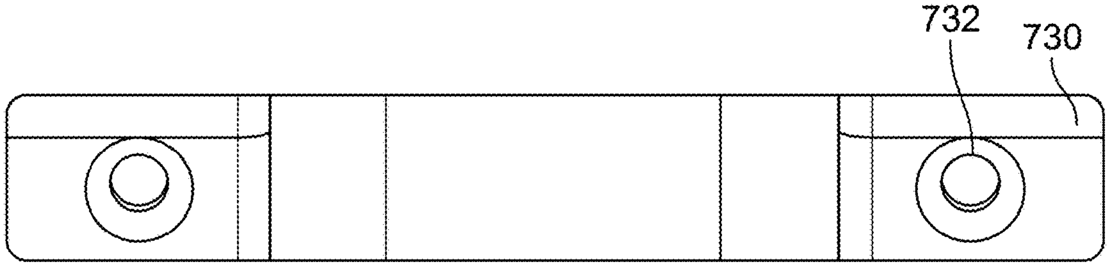
FIG. 38 is a front view of the bracket of FIG. 34.
Figure 39:
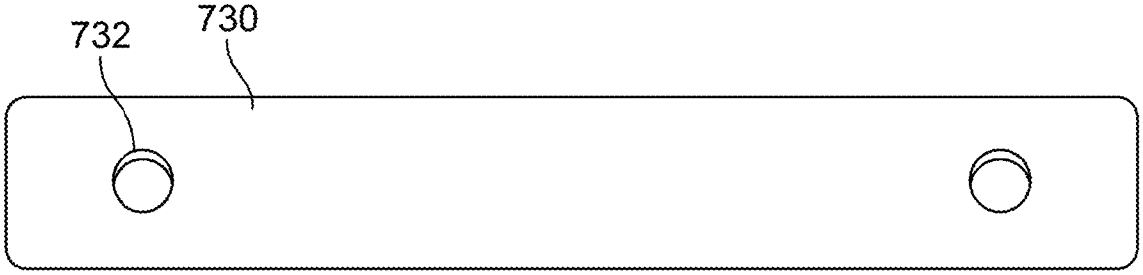
FIG. 39 is a rear view of the bracket of FIG. 34.
Figure 40:
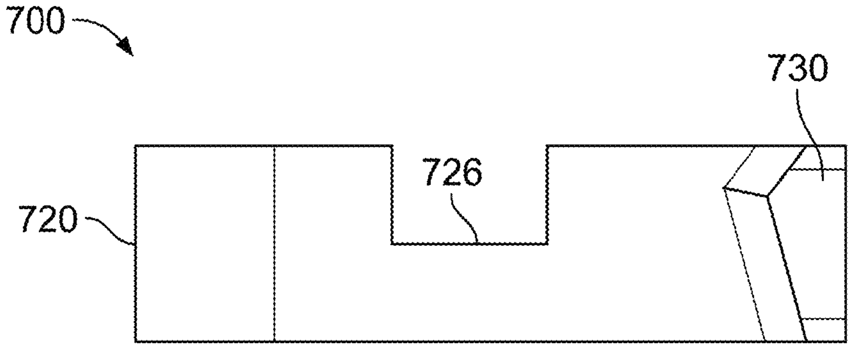
FIG. 40 is a side view of the bracket of FIG. 34, the opposite view being identical.
Figure 41:
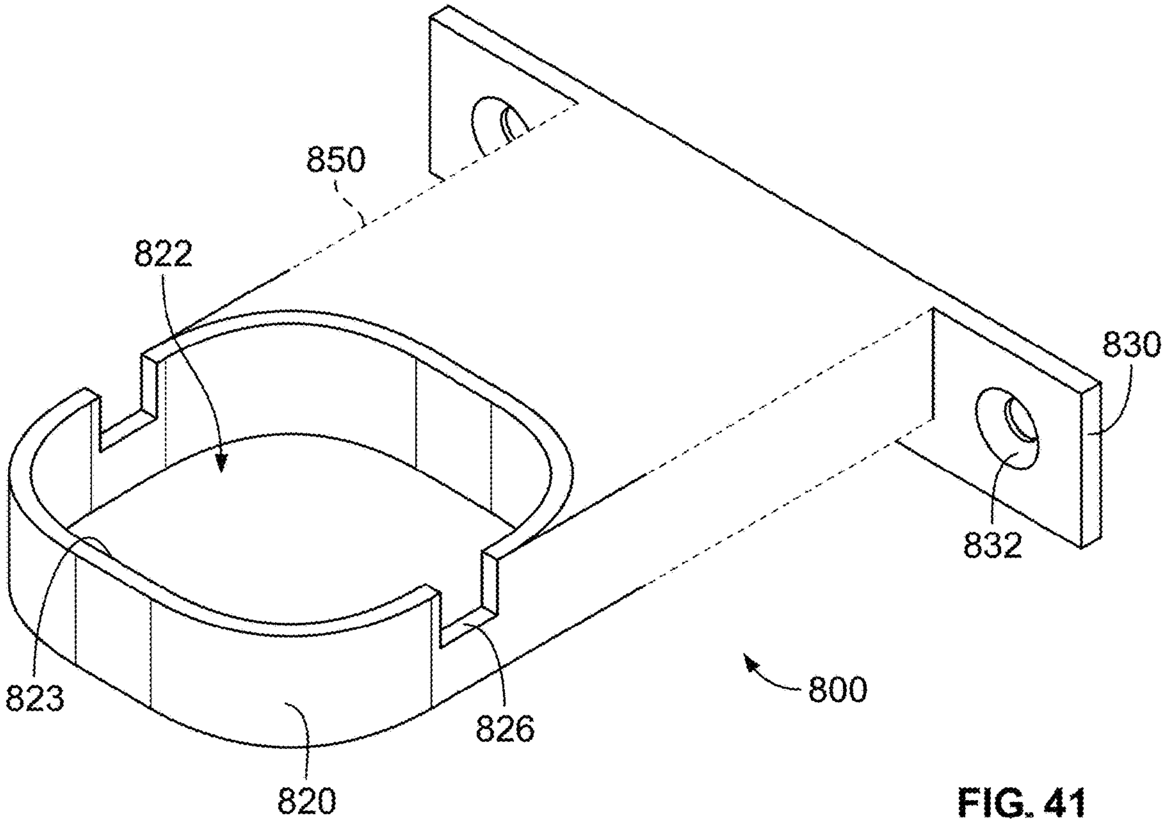
FIG. 41 is a top isometric view of an exemplary long bracket for mounting lights with a large-radiused ("rounded") light-supporting aperture, the upper surface of the optional extension being solid.
Figure 42:
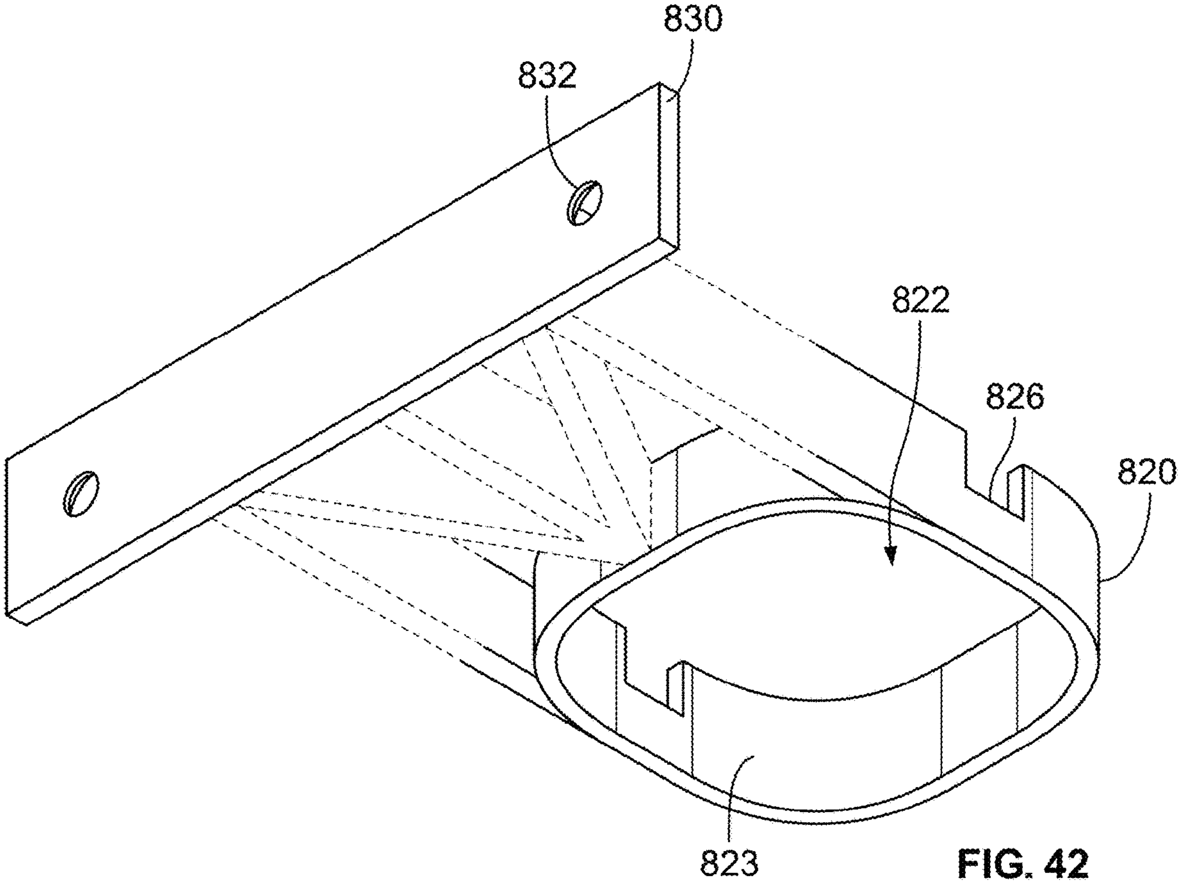
FIG. 42 is a bottom isometric view of the bracket of FIG. 41.
Figure 43:
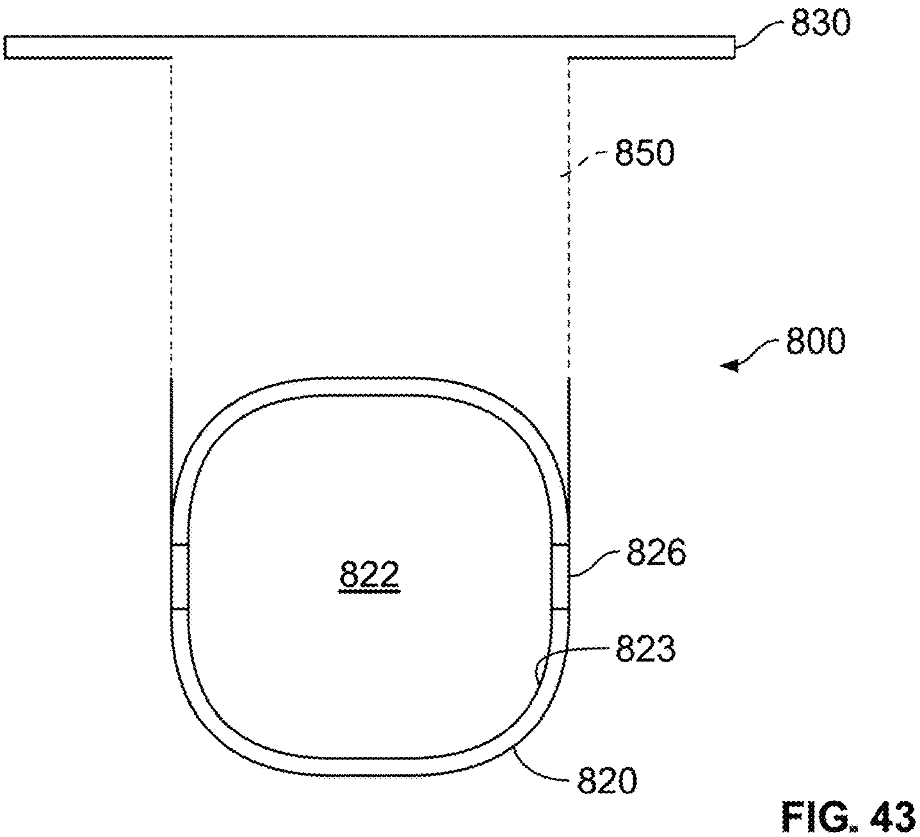
FIG. 43 is a top plan view of the bracket of FIG. 41.
Figure 44:
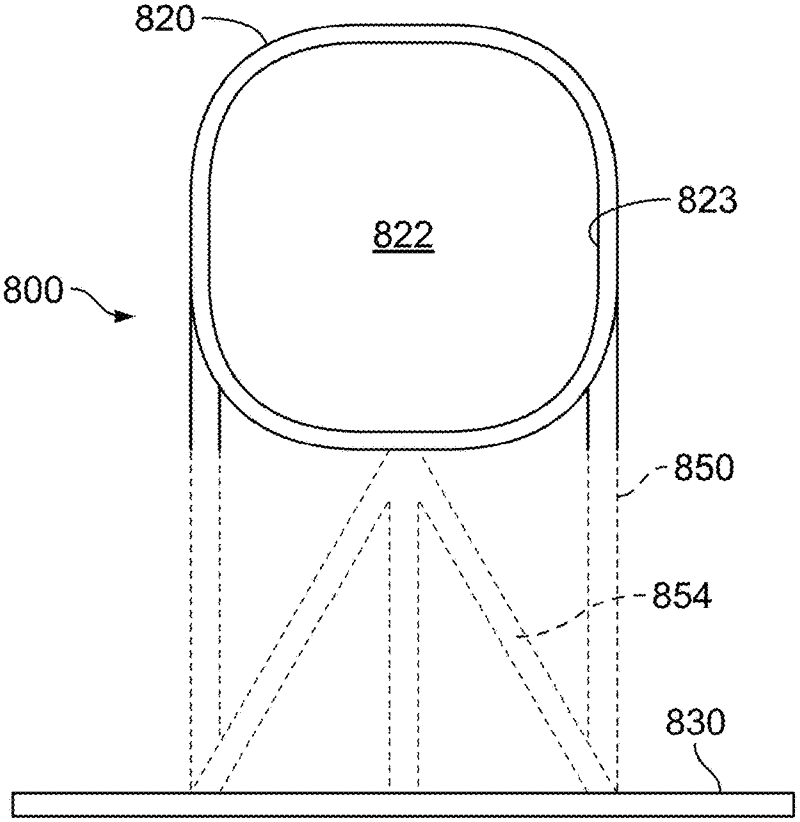
FIG. 44 is a bottom plan view of the bracket of FIG. 41.
Figure 45:
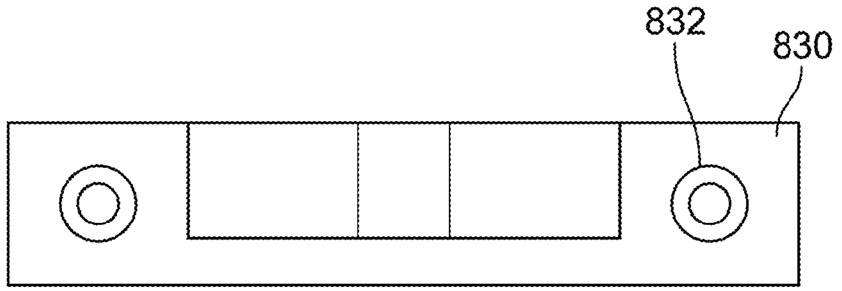
FIG. 45 is a front view of the bracket of FIG. 41.
Figure 46:
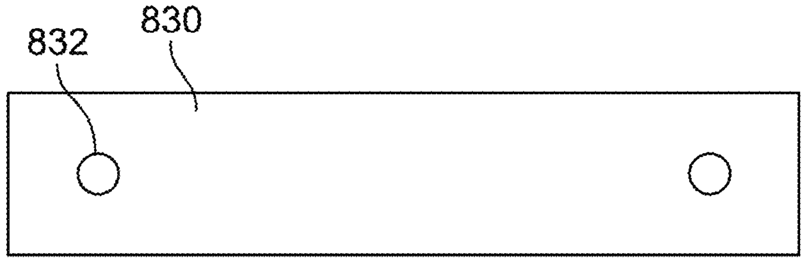
FIG. 46 is a rear view of the bracket of FIG. 41.
Figure 47:
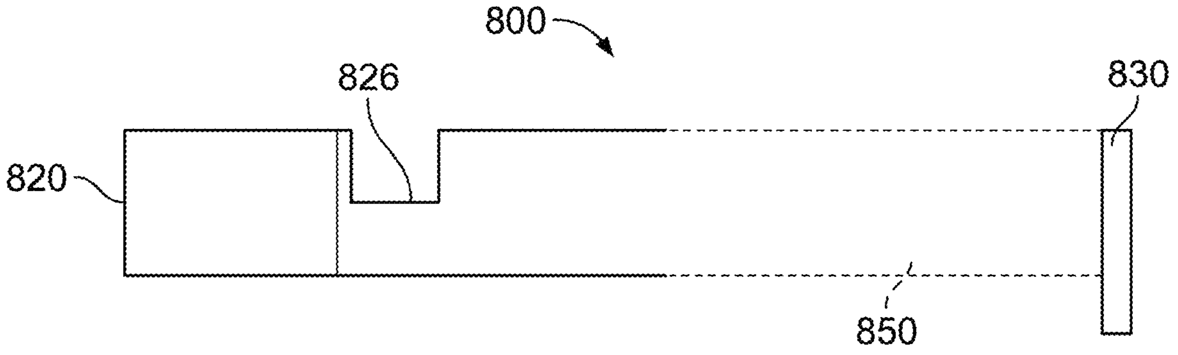
FIG. 47 is a side view of the bracket of FIG. 41, the opposite view being identical.

FIGS. 10-12 show a long bracket 400 for mounting a small-radiused ("squared") light 410. The bracket has a surrounding body 420 with a small-radiused ("squared") light-supporting aperture 422 defined therein. A string slot 426 is defined in the surrounding body 420 on both sides of the light-supporting aperture 422. The surrounding body 420 also has an extension 450 (which is what makes the bracket long and positions the light 410 farther from the wall 80), and the extension 450 has optional vent apertures 452 defined therein. (Although not shown in these figures, the extension may include bracing to strengthen the bracket 400 without adding as much to the weight and material cost as a solid extension would add. A solid extension, however, could also be used.) When the light 410 is positioned within the light-supporting aperture 422, the inner annular aperture surface 423 is shown as being substantially coextensive with the annular edge 413 of the light 410. Further, when the light 410 is positioned within the light-supporting aperture 422, the string 416 (on either side of the light 410) is aligned with and positioned within the respective string slot 426 (on either side of the aperture 422). At the rear edge of the surrounding body 420 is a mounting base 430. The shown mounting base 430 (depicted as a chuck-optimized mounting base) is associated with the rear edge of the surrounding body 420 with the ends of the mounting base 430 extending past both sides of the surrounding body 420. As shown, there is a mounting aperture 432 defined through (front to rear) the ends of the mounting base 430. As shown, when the bracket 400 is attached to the wall 80 (e.g., by screwing a screw 440 through a mounting aperture 432 of the mounting base 430 and into the wall 80), the surrounding body 420 projects outward therefrom. (Put another way, the planar surrounding body 420 is at least substantially perpendicular to the planar mounting base 430 such that they form a three-dimensional, non-planar device.) Then, when the light 410 is positioned within the light-supporting aperture 422, the illumination from the light bulb 414 projects downward, illuminating at least part of the wall 80.

FIGS. 13-19 show an exemplary generic bracket 100' for mounting lights. The break between the surrounding body 120' and the mounting base 130' show that the bracket 100' may be any length (long or short). The light-supporting aperture 122' surrounded by the dashed inner annular aperture surface 123' shows that the light-supporting aperture 122' may be any shape (e.g., "rounded" or "squared"). The dashed string slot 126' shows that the string slot can be any length and shape. The dashed mounting aperture 132' shows that alternative connectors could be used. For example, the aperture would not be necessary if a self-drilling screw was used. The dashed rear of the mounting base 130' shows that there may be additional structure (e.g., feet). Although not shown, the exterior shape of the surrounding body 120' could have an alternative shape (e.g., squared corners or beveled corners). Although shown as a chuck-optimized mounting base 130', the mounting base could have alternative shapes as well.

Like FIGS. 10-12, FIGS. 20-26 show a long bracket 500 for mounting a small-radiused ("squared") light (not shown in these figures). The bracket has a surrounding body 520 with a small-radiused ("squared") light-supporting aperture 522 defined therein. (Depending on the type of light to be supported, the light-supporting aperture could be a large-radiused ("rounded") light-supporting aperture (as shown in FIGS. 41-47) or another type of light-supporting aperture.) A string slot 526 is defined in the surrounding body 520 on both sides of the light-supporting aperture 522. The front portion of the bracket 500 surrounding the light-supporting aperture 522 has a substantially consistent thickness (which reduces both weight and material cost as compared to the similar structure of FIGS. 10-12). The surrounding body 520 also has an extension 550 (which is what makes the bracket long and positions the light farther from the wall). (A bracket could be made identical to bracket 500, but without the extension to obtain a short bracket.) Although the upper surface of the extension 550 is shown as solid, the extension 550 could have one or more optional vent apertures defined therein. The extension 550 is shown as including bracing 554 for strengthening the bracket 500 without adding as much to the weight and material cost as a solid extension would add. (A solid extension, however, could also be used.) Although not shown, when a light is positioned within the light-supporting aperture 522, the inner annular aperture surface 523 is preferably substantially coextensive with the annular edge of the light. Further, when the light is positioned within the light-supporting aperture 522, the string (on either side of the light) is aligned with and positioned within the respective string slot 526 (on either side of the aperture 522). At the rear edge of the surrounding body 520 is a mounting base 530. The shown mounting base 530 (depicted as a simple rectangular base) is associated with the rear edge of the surrounding body 520 with the ends of the mounting base 530 extending past both sides of the surrounding body 520. (The mounting base 530 could also be a chuck-optimized mounting base.) As shown, there is a mounting aperture 532 defined through (front to rear) the ends of the mounting base 530. Although not shown, if the bracket 500 is attached to a wall (e.g., by screwing a screw through the mounting aperture 532 of the mounting base 530 and into the wall), the surrounding body 520 would project outward therefrom. (Put another way, the planar surrounding body 520 is at least substantially perpendicular to the planar mounting base 530 such that they form a three-dimensional, non-planar device.) Then, if the light is positioned within the light-supporting aperture 522, the illumination from the light bulb would project downward, illuminating at least part of the wall.

Like FIGS. 10-12 and 20-26, FIGS. 27-33 show a long bracket 600 for mounting a small-radiused ("squared") light (not shown in these figures). The bracket has a surrounding body 620 with a small-radiused ("squared") light-supporting aperture 622 defined therein. (Depending on the type of light to be supported, the light-supporting aperture could be a large-radiused ("rounded") light-supporting aperture or another type of light-supporting aperture.) A string slot 626 is defined in the surrounding body 620 on both sides of the light-supporting aperture 622. The front portion of the bracket 600 surrounding the light-supporting aperture 622 has a substantially consistent thickness (which reduces both weight and material cost as compared to the similar structure of FIGS. 10-12). The surrounding body 620 also has an extension 650 (which is what makes the bracket long and positions the light farther from the wall). (As shown in FIGS. 34-40, a bracket 700 could be made substantially identical to bracket 600, but without the extension to obtain a short bracket.) The extension 650 is shown as having optional vent apertures 652 defined therein. The extension 650 is shown as including bracing 654 for strengthening the bracket 600 without adding as much to the weight and material cost as a solid extension would add. (A solid extension, however, could also be used.) Although not shown, when a light is positioned within the light-supporting aperture 622, the inner annular aperture surface 623 is preferably substantially coextensive with the annular edge of the light. Further, when the light is positioned within the light-supporting aperture 622, the string (on either side of the light) is aligned with and positioned within the respective string slot 626 (on either side of the aperture 622). At the rear edge of the surrounding body 620 is a mounting base 630. The shown mounting base 630 (depicted as a chuck-optimized mounting base) is associated with the rear edge of the surrounding body 620 with the ends of the mounting base 630 extending past both sides of the surrounding body 620. (The mounting base 630 could also have an alternative shape such as the simple rectangular base of FIGS. 20-26.) As shown, there is a mounting aperture 632 defined through (front to rear) the ends of the mounting base 630. Although not shown, if the bracket 600 is attached to a wall (e.g., by screwing a screw through the mounting aperture 632 of the mounting base 630 and into the wall), the surrounding body 620 would project outward therefrom. (Put another way, the planar surrounding body 620 is at least substantially perpendicular to the planar mounting base 630 such that they form a three-dimensional, non-planar device.) Then, if the light is positioned within the light-supporting aperture 622, the illumination from the light bulb would project downward, illuminating at least part of the wall.

FIGS. 34-40 are similar to FIGS. 27-33 except, instead of showing a long bracket, FIGS. 34-40 show a short bracket 700 for mounting a small-radiused ("squared") light (not shown in these figures). The bracket has a surrounding body 720 with a small-radiused ("squared") light-supporting aperture 722 defined therein. (Depending on the type of light to be supported, the light-supporting aperture could be a large-radiused ("rounded") light-supporting aperture or another type of light-supporting aperture.) A string slot 726 is defined in the surrounding body 720 on both sides of the light-supporting aperture 722. The front portion of the bracket 700 surrounding the light-supporting aperture 722 has a substantially consistent thickness (which reduces both weight and material cost as compared to the similar structure of FIGS. 4-6). Although not shown, when a light is positioned within the light-supporting aperture 722, the inner annular aperture surface 723 is preferably substantially coextensive with the annular edge of the light. Further, when the light is positioned within the light-supporting aperture 722, the string (on either side of the light) is aligned with and positioned within the respective string slot 726 (on either side of the aperture 722). At the rear edge of the surrounding body 720 is a mounting base 730. The shown mounting base 730 (depicted as a chuck-optimized mounting base) is associated with the rear edge of the surrounding body 720 with the ends of the mounting base 730 extending past both sides of the surrounding body 720. (The mounting base 730 could also have an alternative shape such as the simple rectangular base of FIGS. 20-26.) As shown, there is a mounting aperture 732 defined through (front to rear) the ends of the mounting base 730. Although not shown, if the bracket 700 is attached to a wall (e.g., by screwing a screw through the mounting aperture 732 of the mounting base 730 and into the wall), the surrounding body 720 would project outward therefrom. (Put another way, the planar surrounding body 720 is at least substantially perpendicular to the planar mounting base 730 such that they form a three-dimensional, non-planar device.) Then, if the light is positioned within the light-supporting aperture 722, the illumination from the light bulb would project downward, illuminating at least part of the wall.

Like FIGS. 20-26, FIGS. 41-47 show a long bracket 800 for mounting a light (not shown in these figures). Whereas the surrounding body 520 of the bracket 500 of FIGS. 20-26 has a small-radiused ("squared") light-supporting aperture 522 defined therein, the bracket 800 of FIGS. 41-47 has a surrounding body 820 with a large-radiused ("rounded") light-supporting aperture 822 defined therein. (Depending on the type of light to be supported, the light-supporting aperture could be another type of light-supporting aperture.) A string slot 826 is defined in the surrounding body 820 on both sides of the light-supporting aperture 822. The front portion of the bracket 800 surrounding the light-supporting aperture 822 has a substantially consistent thickness (which reduces both weight and material cost). The surrounding body 820 also has an extension 850 (which is what makes the bracket long and positions the light farther from the wall). (A bracket could be made identical to bracket 800, but without the extension to obtain a short bracket.) Although the upper surface of the extension 850 is shown as solid, the extension 850 could have one or more optional vent apertures defined therein. The extension 850 is shown as including bracing 854 for strengthening the bracket 800 without adding as much to the weight and material cost as a solid extension would add. (A solid extension, however, could also be used.) Although not shown, when a light is positioned within the light-supporting aperture 822, the inner annular aperture surface 823 is preferably substantially coextensive with the annular edge of the light. Further, when the light is positioned within the light-supporting aperture 822, the string (on either side of the light) is aligned with and positioned within the respective string slot 826 (on either side of the aperture 822). At the rear edge of the surrounding body 820 is a mounting base 830. The shown mounting base 830 (depicted as a simple rectangular base) is associated with the rear edge of the surrounding body 820 with the ends of the mounting base 830 extending past both sides of the surrounding body 820. (The mounting base 830 could also be a chuck-optimized mounting base.) As shown, there is a mounting aperture 832 defined through (front to rear) the ends of the mounting base 830. Although not shown, if the bracket 800 is attached to a wall (e.g., by screwing a screw through the mounting aperture 832 of the mounting base 830 and into the wall), the surrounding body 820 would project outward therefrom. (Put another way, the planar surrounding body 820 is at least substantially perpendicular to the planar mounting base 830 such that they form a three-dimensional, non-planar device.) Then, if the light is positioned within the light-supporting aperture 822, the illumination from the light bulb would project downward, illuminating at least part of the wall.

Variations:

As described herein, there are many variations in the features of the brackets that can be substituted or combined with the shown features. The following are some of the described features (e.g., shown and/or discussed) that can be modified and some of the variations of those features.

The exterior shape of the surrounding body may be modified for aesthetics or to accommodate different lights. FIGS. 1-47 show various surrounding bodies. FIGS. 48-51 show alternative surrounding bodies 920*a*, 920*b*, 920*c*, and 920*d* with other exterior shapes. The shown and described surrounding bodies may be modified to be in accordance with other shown and described variations.

The dimensions of the surrounding body may be modified based on intended use and materials. For example, the length (from the front edge to the rear edge) may be short (e.g., FIGS. 1-3 and 4-6), medium (e.g., FIG. 51), long (e.g., FIGS. 7-9 and 10-12), or lengths therebetween. The difference in length may be accomplished by using an "extension." As shown, the extension is integral with the remainder of the surrounding body, although it could be a separate component. The shown and described surrounding bodies may be modified to different lengths.

FIGS. 1-47 show various surrounding bodies. FIGS. 48-51 show alternative surrounding bodies 920*a*, 920*b*, 920*c*, and 920*d* with other exterior shapes. The shown and described surrounding bodies may be modified to be in accordance with other shown and described variations.

Figure 50:
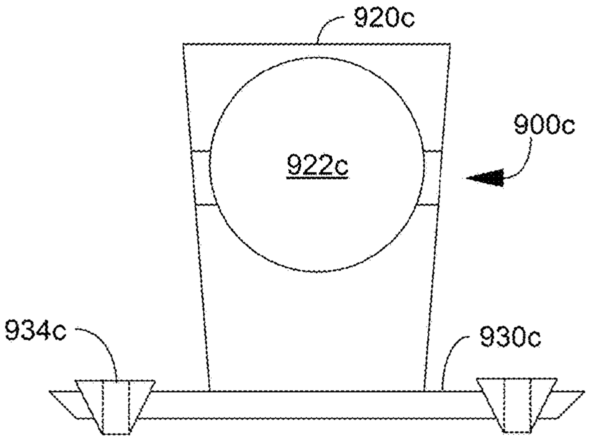
FIG. 50 is a top plan view of the bracket of an exemplary long bracket for mounting lights, the bracket having a trapezoidal surrounding body with a round light-supporting aperture, the mounting base having associated feet.
Figure 51:
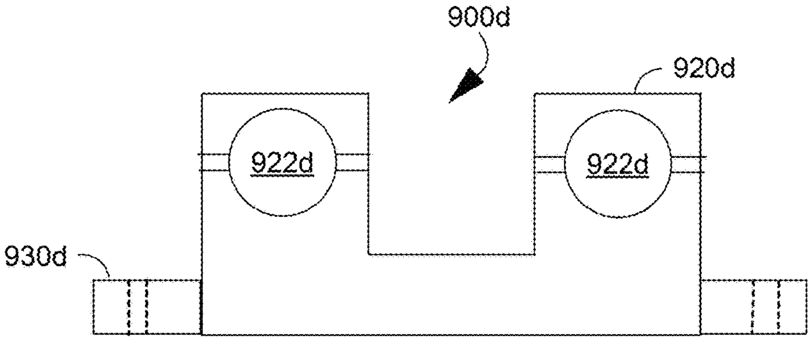
FIG. 51 is a top plan view of the bracket of an exemplary medium length bracket for mounting lights, the bracket having a surrounding body with two peninsulas (projections), each peninsula having a round light-supporting aperture.

The light-supporting aperture may be modified to accommodate different lights. For example, brackets shown with a "rounded" supporting aperture may be modified to have a "squared" supporting aperture. Alternatively, brackets shown with a "squared" supporting aperture may be modified to have a "rounded" supporting aperture. FIGS. 48-51 show alternatively shaped (e.g., round and rectangular/square) supporting apertures 922*a*, 922*b*, 922*c*, and 922*d*. FIG. 51 also shows that there may be multiple supporting apertures 922*d*. The round supporting apertures may be threaded. The shown and described light-supporting apertures may be modified to be in accordance with other shown and described variations.

Figure 48:
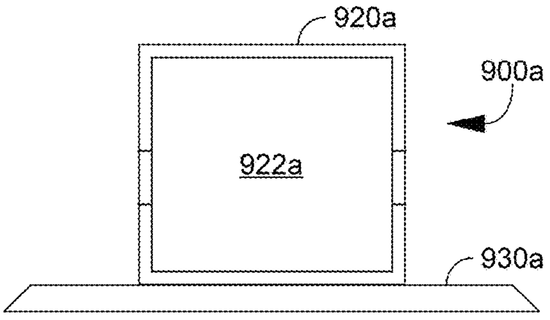
FIG. 48 is a top plan view of the bracket of an exemplary short bracket for mounting lights, the bracket having a substantially square/rectangular surrounding body with a square light-supporting aperture.
Figure 49:
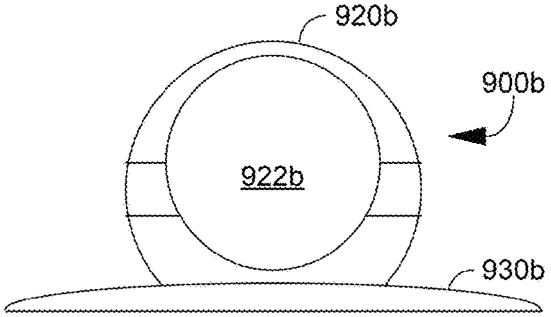
FIG. 49 is a top plan view of the bracket of an exemplary short bracket for mounting lights, the bracket having a substantially round surrounding body with a round light-supporting aperture.

The mounting base may be modified to accommodate different connectors. For example, if self-drilling screws are to be used, the mounting base 930*a*, 930*b* may be free from apertures, as shown in FIGS. 48-49. The rear surface of the mounting base may be modified to accommodate different surfaces. For example, FIG. 50 shows the back surface of the mounting base 930*c* with feet 934*c*. The feet 934*c* may provide an air gap to separate the mounting base 930*c* from the wall to which it is attached. The mounting base may also be divided or split as shown in FIG. 51 by the use of outwardly projecting mounting tabs 930*d*. The rear surface would include the rear surface of a first tab 930*d*, the rear surface of the surrounding body 920*d*, and the rear surface of the second tab 930*d*. The shown and described mounting bases may be modified to be in accordance with other shown and described variations.

As mentioned, the light-supporting aperture is preferably substantially coextensive with the annular edge of the light that it is designed to support. This may result in the light being "snap" fittable, friction fittable, or just seated within the light-supporting aperture. Although there are advantages to the light-supporting aperture being substantially coextensive with the annular edge of the light, alternative brackets could be substantially non-coextensive. For example, if the lights tend to run "hot," there may be venting apertures in the portions of the bracket surrounding the aperture. Another example is that if the light housing (canister) is particularly long, it may not be necessary to cover the entire light housing. The shown and described light-supporting apertures may be modified to be in accordance with other shown and described variations.

When the light 110 is positioned within the light-supporting aperture 122, the string 116 on either side of the light 110 is aligned with and positioned within the respective string slot 126 on either side of the aperture 122. The shown string slots are rectangular in cross-section. Alternative string slots can have alternative cross-sectional shapes including rounded (e.g., a semi-circular string slot 926*i* as shown in FIG. 59) or V-shaped. The shown and described string slots may be modified to be in accordance with other shown and described variations.

Most of the shown mounting bases are shown as chuck-optimized mounting bases 130, 130', 230, 330, 430, 630, 730, 930*h*. Chuck-optimized mounting bases have at least part of the front surface angled to allow a drill having a chuck to have easy access to the connector without the chuck bumping into the surrounding body. Most of the chuck-optimized mounting bases 130, 130', 230, 330, 430, 630, 730 have the lower approximately ⅔ of the front surface angled downward. One of the chuck-optimized mounting bases 930*h* (FIG. 56) has the lower approximately ½ of the front surface angled downward. The entire front surface of the mounting base 930*i* could also be angled downward as shown in FIG. 59. The downward angled surface allows a drill having a chuck to access the connector from below the bracket as shown in FIG. 56.

Some of the surrounding bodies 320, 420, 620, are shown with optional vent apertures 352, 452, 652 defined therein. In particular, the shown vent apertures 352, 452, 652 are shown as being defined in the extension 350, 450, 650 of the long surrounding bodies. One reason for inclusion of vent apertures is to reduce the water flowing toward the lights. Another reason for inclusion of vent apertures is to reduce the amount of snow accumulating on the surrounding body to reduce excess weight. The shown and described surrounding bodies (particularly the long surrounding bodies) without vents defined therein may be modified to include vent apertures (or other apertures). The shown and described surrounding bodies with vents defined therein may be modified so that they do not include vent apertures. Although not shown, the upper surfaces of the surrounding bodies may be modified to include protrusions, to include surface texture, or to have alternative shapes (e.g., being convex).

Adapters:

FIGS. 57-62 show exemplary adapters 960*i*-960*j*. Although custom brackets can be made for every type of light, sometimes customization is not practical. For example, if a user has already installed brackets, he may not want to remove the brackets even though he wants to replace the lights with different type of lights. Adapters may be used so that the installed brackets can be used with different types of lights. The following are exemplary adapters.

FIGS. 57-59 show a set-in adapter 960*i* with an interior light-supporting aperture 962*i* (for supporting a light 910*i*) and an exterior annular surface 963*i* (that substantially fits within the light-supporting aperture 922*i* of the surrounding body 920*i* of the bracket 900*i*). Set-in adapters 960*i* are placed in (inserted into) the light-supporting aperture 922*i*. They can be snap fit or friction fit. If the exterior annular surface is circular (and the light-supporting aperture is circular), the set-in adapter could be screwed in place. As shown, the set-in adapter 960*i* has a square exterior annular surface 963*i* that is substantially the same size (albeit just slightly smaller) and shape as the inner annular aperture surface 923*i* of the light-supporting aperture 922*i*. There is a rim 964*i* at the top of the set-in adapter 960*i* that is wider than the exterior annular surface 963*i*. When the set-in adapter 960*i* is placed into the light-supporting aperture 922*i*, the rim 964*i* prevents it from falling through the light-supporting aperture 922*i*. The upper surface and rim 964*i* include string slots 926*i* aligned with the string slots on the upper surface of the surrounding body 920*i*. When a light 910*i* is inserted into the light-supporting aperture 962*i*, the string 916*i* lies in the string slot(s) 926*i* and the bulb 914*i* may protrude slightly therefrom.

Figure 60:
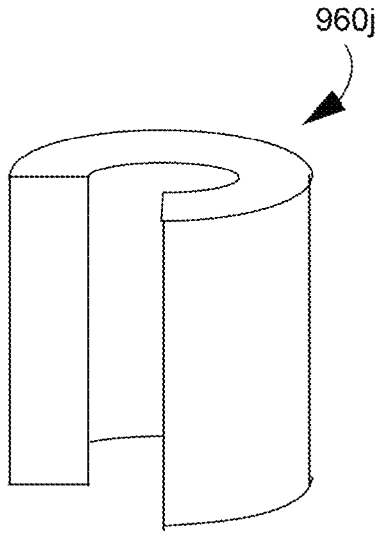
FIG. 60 is a perspective side view of an exemplary squishy wrap adapter.
Figure 61:
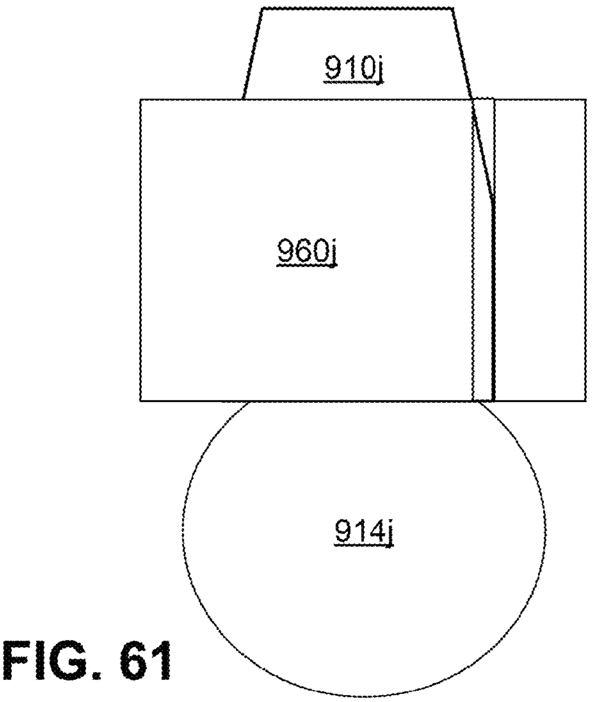
FIG. 61 is a side view of the exemplary squishy wrap adapter of FIG. 57 wrapped around the light, but leaving the bulb protruding therefrom.
Figure 62:
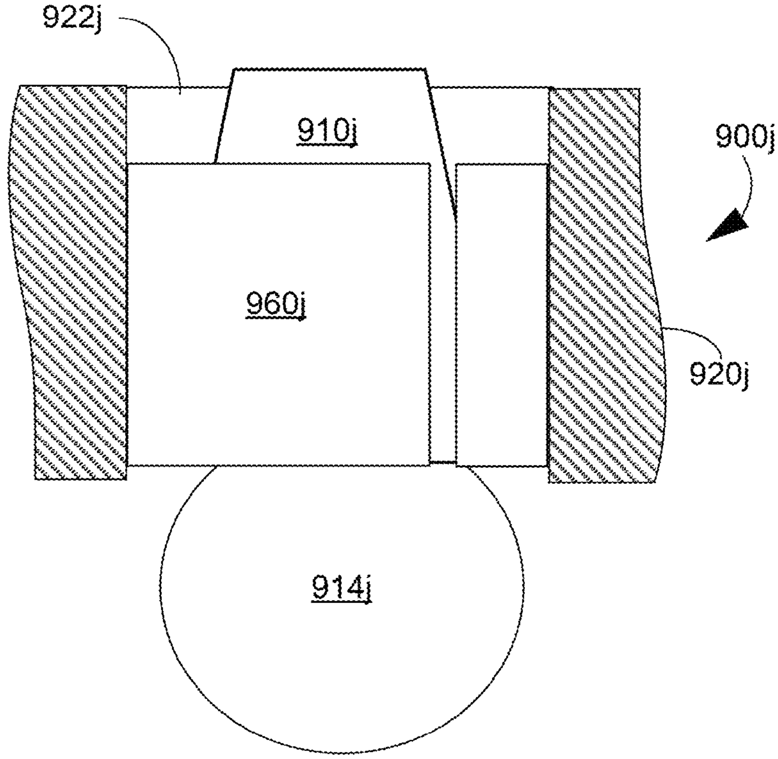
FIG. 62 is a cross-sectional side view of the light wrapped by the exemplary squishy wrap adapter of FIG. 57, both of which are inserted in a light-supporting aperture of a bracket, the light being supported by the squishy wrap adapter and the bracket.

FIGS. 60-62 show a squishy wrap adapter 960*j*. The squishy wrap adapter 960*j* may be a piece of foam or rubber. It may also be a foam or rubber tube that has been cut from top to bottom. As shown in FIG. 61, the squishy wrap adapter 960*j* is at least partially wrapped around the light 910*j* leaving the bulb 914*j* protruding therefrom. The wrapped light 910*j* is then inserted into the light-supporting aperture 922*j*. As shown in FIG. 62, the light 910*j* is wrapped by the exemplary squishy wrap adapter 960*j*, both of which are inserted in a light-supporting aperture 922*j* of a surrounding body 920*j* of a bracket 900*j*. The squishy wrap adapter 960*j* may compress at least slightly as it is inserted into the light-supporting aperture 922*j*. When in position, the squishy wrap adapter 960*j* would tend to expand and, thereby, prevent the light 910*j* from moving downward. The string (not shown) on the bulb in the string slot (not shown) would also help to hold the light 910*j* in position. When positioned in the bracket 900*j*, the light 910*j* is supported by the squishy wrap adapter 960*j* and the bracket 900*j*. The bulb 914*j* is shown as protruding from the light-supporting aperture 922*j*.

Dimensions, Orientation, and Terminology:

Although some figures show the brackets as integral units, brackets may be constructed from component parts that are secured together. Similarly, although some figures show the brackets as component parts that are secured together, the brackets may be constructed as an integral unit. Although discussed as distinct components herein, the components of the bracket may not be distinct.

Figure 52:
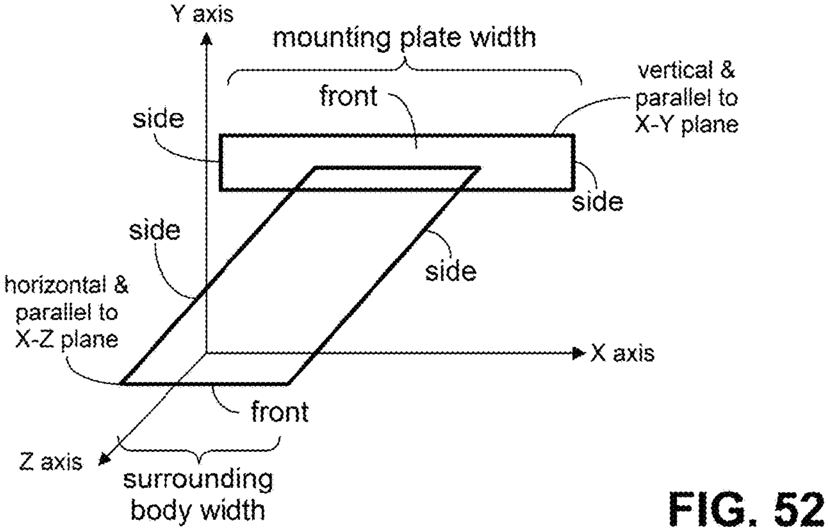
FIG. 52 is an isometric view showing a vertical X-Y plane and a horizontal X-Z plane in relation to X, Y, and Z axes.

FIG. 52 shows the X, Y, and Z axes as well as a "vertical plane" (X-Y plane) and a "horizontal plane" (X-Z plane). A wall and a mounting base would be vertical (parallel to the X-Y plane) like the shown vertical plane. A surrounding body would be horizontal (parallel to the X-Z plane) like the shown horizontal plane. It should be noted that the terms "horizontal" and "vertical" are not meant to be exact, but are meant to include "substantially horizontal" and "substantially vertical," respectively. Walls may not be exactly vertical and, therefore, the vertical mounting base may not be exactly vertical and, similarly, the horizontal surrounding body may not be exactly horizontal. Further, manufacturing irregularities may result in a surrounding body not being exactly perpendicular to the mounting base. Finally, some surfaces may not be planar (e.g., the front surface of the chuck-optimized mounting base), so the terms "horizontal" and "vertical" relate to the component's general (or overall) orientation and/or its orientation in relation to the other components.

Each surrounding body 120, 120', 220, 320, 420, 520, 620, 720, 820 has a top surface, bottom surface, front edge, rear edge, and two sides. The front edge is separated from the rear edge by the two sides. The front edge, rear edge, and two sides form an annular edge separating the top surface from the bottom surface. Although unlabeled, FIGS. 15, 22, 29, 36, and 43 show the top surface. Although unlabeled, FIGS. 16, 23, 30, 37, and 44 show the bottom surface. Although unlabeled, FIGS. 17, 24, 31, 38, and 45 show the front edge. Although unlabeled, FIGS. 18, 25, 32, 39, and 46 would show the rear edge, but it is obscured (blocked from view) by the associated mounting base. Although unlabeled, FIGS. 19, 26, 33, 40, and 47 show both sides (which are identical).

Each mounting base 130, 130', 230, 330, 430, 530, 630, 730, 830 has a front surface, rear surface, top edge, bottom edge, and two side edges. The top edge, bottom edge, and two side edges form an annular edge separating the front surface from the rear surface. Although unlabeled, FIGS. 15, 22, 29, 36, and 43 show the top edge. Although unlabeled, FIGS. 16, 23, 30, 37, and 44 show the bottom edge. Although unlabeled, FIGS. 17, 24, 31, 38, and 45 show the front surface. Although unlabeled, FIGS. 18, 25, 32, 39, and 46 show the rear surface. Although unlabeled, FIGS. 19, 26, 33, 40, and 47 show both side edges (which are identical).

The front surface of each mounting base 130, 130', 230, 330, 430, 530, 630, 730, 830 is associated with (e.g., integral with or attached to) the rear edge of its respective surrounding body 120, 120', 220, 320, 420, 520, 620, 720, 820 with the ends of the mounting base extending past both sides of the surrounding body. When the mounting base is attached to a substantially vertical wall, the surrounding body projects outward (so that the front edge is distal from the wall) such that the top surface of the surrounding body is substantially horizontal. (Put another way, the planar surrounding body is at least substantially perpendicular to the planar mounting base such that they form a three-dimensional, non-planar device.) Because the brackets mount to a wall, they can be used to decorate houses without eaves.

As best seen in the front and side views in FIGS. 24, 26, 31, 33, 38, and 40, the thickness measurement (top surface to bottom surface) of the shown surrounding bodies may have substantially the same length as the height measurement (top edge to bottom edge) of the mounting base. Alternatively, as best seen in the front and side views in FIGS. 17, 19, 45, and 47, the thickness measurement (top surface to bottom surface) of the shown surrounding bodies may be shorter than the height measurement (top edge to bottom edge) of the mounting base.

As best seen in the front and side views, the shown rear edge of the surrounding body is preferably substantially longitudinally centered along the longitudinal length (from side edge to side edge) of the front surface of the mounting base. As best seen in the front and side views, the shown rear edge of the surrounding body is preferably substantially vertically centered (FIGS. 24, 26, 31, 33, 38, and 40) or towards the top (FIGS. 17, 19, 45, and 47) of the vertical height (from top edge to bottom edge) of the front surface of the mounting base.

Figure 53:
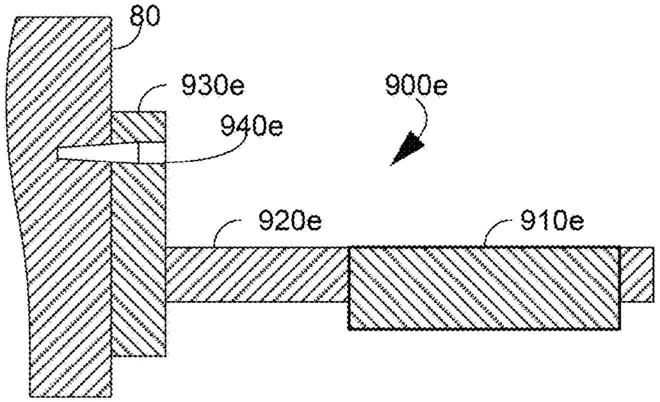
FIG. 53 is a cross-sectional side view of the bracket of an exemplary long bracket for mounting lights, the surrounding body positioned vertically towards the bottom of the vertical height of the front surface of the mounting base.
Figure 54:
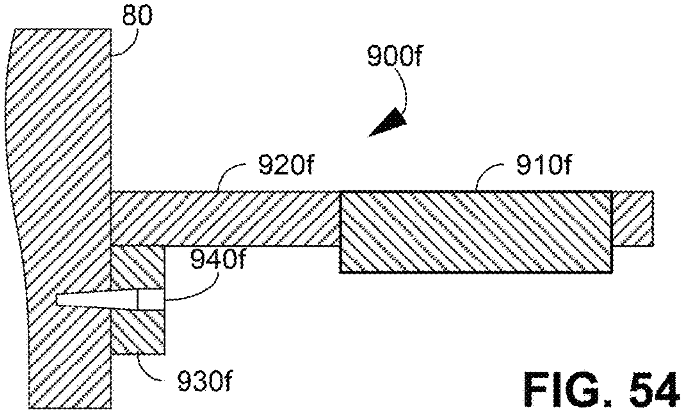
FIG. 54 is a cross-sectional side view of the bracket of an exemplary long bracket for mounting lights, the top edge of the mounting base positioned below the bottom surface (near the rear edge) of the surrounding body.
Figure 55:
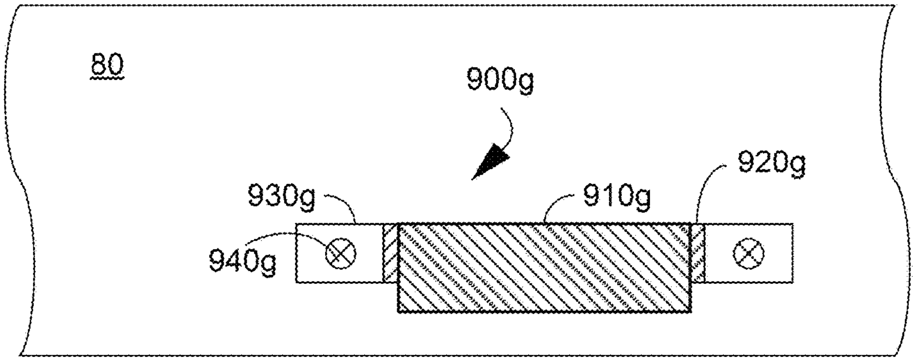
FIG. 55 is a cross-sectional front view of the bracket of an exemplary long bracket for mounting lights, split mounting base positioned on both side edges (near the rear edge) of the surrounding body.
Figure 56:
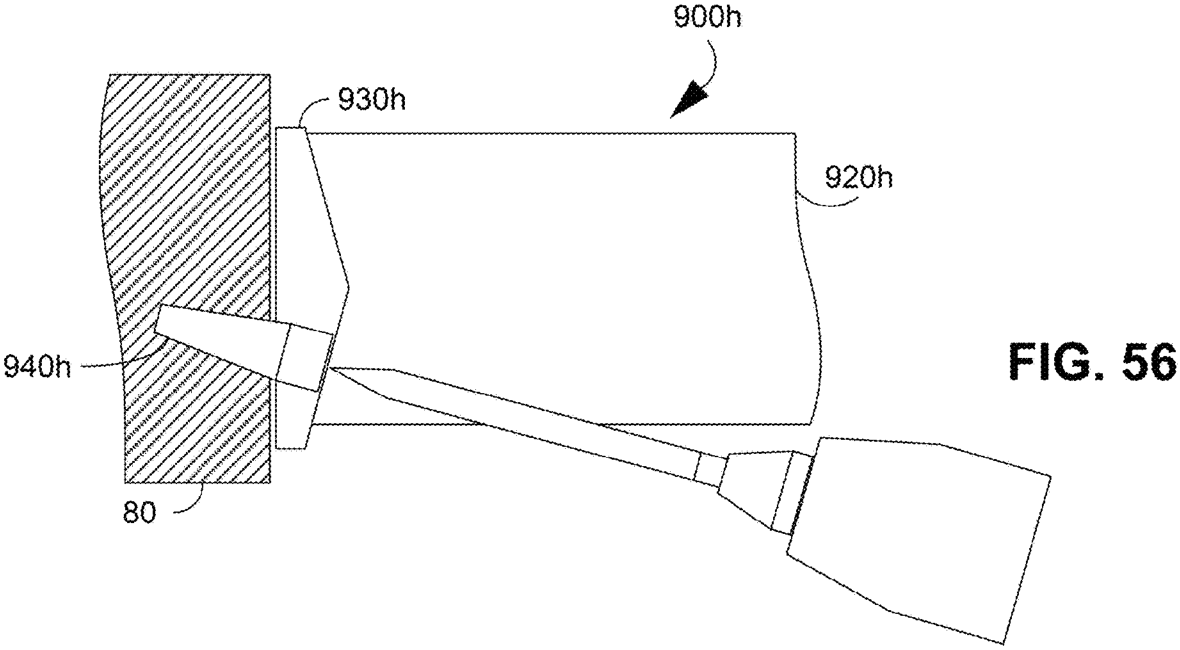
FIG. 56 is a side view of an exemplary chuck-optimized mounting base and a drill chuck.

FIGS. 53-55 show exemplary alternative brackets 900*e*-900*g* in which the surrounding body 920*e*-920*g* has an alternative relationship with the mounting base 930*e*-930*g* (which is secured to the wall 80 by at least one connector

940*e*-940*g*). In these figures, a light 910*e*-910*g* is supported by each bracket 900*e*-900*g*, which is attached to a wall 80 by a connector 940*e*-940*g*. For example, in FIG. 53, the rear edge of the surrounding body 920*e* is vertically positioned towards the bottom of the vertical height (from top edge to bottom edge) of the front surface of the mounting base 930*e*. FIG. 54 shows the top edge of the mounting base 930*f* is positioned below the bottom surface (near the rear edge) of the surrounding body 920*f*. FIG. 55 shows a split mounting base 930*g* (or mounting tabs similar to the mounting base 930*d* in FIG. 51) being positioned on both side edges (near the rear edge) of the surrounding body 920*g*. It should be noted that the mounting base 930*e*-930*g* is still vertical and the surrounding body 920*e*-920*g* is still horizontal.

Advantages:

As discussed in the Background, there are known surrounding clips that include a surrounding body (e.g., a body with an aperture) with slots on opposite sides thereof. The slots are sized to accommodate the string. The surrounding body also has mounting structure (e.g., screw mount tabs). Each screw mount tab has a screw aperture through which a screw may be inserted. In use, a surrounding clip surrounds the light and is screwed into the underside of the eaves (the surface under the eaves) to further secure the light to the underside of the eave. This causes the light to be "sandwiched" between the eave and the surrounding clip. If a light (or an entire light string) needed to be removed or replaced, each surrounding clip would have to be removed. This would be a tedious process at best. It would also require the screws to be removed and replaced, which often comes with issues regarding stripped holes.

The brackets described herein offer a significant improvement over the known surrounding clips. The vertical mounting base is secured to a wall (vertical surface). If there is an eave, the brackets can be secured vertically spaced downward from the eave. This leaves a gap through which the light (and the string(s) associated with the light) can be removed and replaced without necessitating the removal or replacement of the brackets. If the user decides to use different lights (or light strings), adapters may be used to accommodate the shape and dimensional differences therebetween. The brackets do not have to be removed or replaced.

Another advantage is that the brackets described herein may be installed on buildings that lack eaves or have eaves that are not suitable for the installation of light strings designed to be secured to the underside of the eaves.

Miscellaneous:

Please note that the terms and phrases used herein may have additional definitions and/or examples throughout the specification. Where otherwise not specifically defined, words, phrases, and acronyms are given their ordinary meaning in the art. The following paragraphs provide basic parameters for interpreting terms and phrases used herein.

It should be noted that some terms used in this specification are meant to be relative. For example, the terms "horizontal" and "vertical" are meant to be relative. Similarly, the term "top" is meant to be relative to the term "bottom" and the term "front" is meant to be relative to the term "rear." Another example is that the terms "vertical plane" (X-Y plane) and "horizontal plane" (X-Z plane) are meant to be relative. If the bracket and/or light was rotated, the terms would change accordingly. Put another way, rotation of the bracket or light might change the terminology, but not the concept.

The term "associated" is defined to mean integral or original, retrofitted, attached, and/or connected (including functionally connected).

It should be noted that relative terms are meant to help in the understanding of the technology and are not meant to limit the scope of the invention. Similarly, unless specifically stated otherwise, the terms "first" and "second" are meant solely for purposes of designation and not for order or limitation.

Terms such as "may," "might," "can," and "could" are used to indicate alternatives and optional features and only should be construed as a limitation if specifically included in the claims. It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representation, and/or illustration of a type. The term "exemplary" does not necessarily mean the best or most desired of the type.

It should be noted that, unless otherwise specified, the term "or" is used in its nonexclusive form (e.g., "A or B" includes, but is not limited to, A, B, A and B, or any combination thereof). It should be noted that, unless otherwise specified, "and/or" is used similarly (e.g., "A and/or B" includes, but is not limited to, A, B, A and B, or any combination thereof). It should be noted that, unless otherwise specified, the terms "includes," "has," and "contains" (and variations of these terms) mean "comprises" (e.g., a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g., "component," "module," or "step") may include plurals (e.g., "components," "modules," or "steps"), unless the context clearly dictates otherwise.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references (including, but not limited to, publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A bracket for mounting a light, said bracket comprising:

(a) a horizontal surrounding body with a light-supporting aperture defined therein, a string slot is defined in sides of said horizontal surrounding body on opposite sides of said light-supporting aperture;

(b) a vertical mounting base, a rear edge of said horizontal surrounding body associated with said vertical mounting base such that ends of said vertical mounting base extend beyond said sides of said horizontal surrounding body; and (c) said horizontal surrounding body being integral with said vertical mounting base.

2. The bracket of claim 1, said vertical mounting base having at least one mounting aperture defined therein.

3. The bracket of claim 1, said vertical mounting base being a chuck-optimized vertical mounting base.

4. The bracket of claim 1, said light-supporting aperture being a large-radiused light-supporting aperture.

5. The bracket of claim 1, said light-supporting aperture being a small-radiused light-supporting aperture.

6. The bracket of claim 1, wherein said bracket is a long bracket having an extension between said light-supporting aperture and said vertical mounting base.

7. The bracket of claim 1, wherein said bracket is a long bracket having an extension between said light-supporting aperture and said vertical mounting base, said extension having at least one vent apertures defined therein.

8. The bracket of claim 1, wherein said light-supporting aperture is configured to receive said light attached to a string and said string slots are configured to receive said string.

9. The bracket of claim 1, further including an adapter, said adapter fitting within said light-supporting aperture, said light fitting within said adapter.

10. A bracket for mounting a light of a light string, said light having a light housing and a light bulb, a string traverses said light housing and extends outward from opposite sides of said light housing, said bracket comprising:

(a) a horizontal surrounding body with a light-supporting aperture defined therein, a string slot is defined in sides of said horizontal surrounding body on opposite sides of said light-supporting aperture;

(b) a vertical mounting base, a rear edge of said horizontal surrounding body associated with said vertical mounting base such that ends of said vertical mounting base extend beyond said sides of said horizontal surrounding body; and (c) said horizontal surrounding body being integral with said vertical mounting base;

(d) wherein said light-supporting aperture is configured to receive said light and said string slots are configured to receive said string.

11. The bracket of claim 10, said vertical mounting base having at least one mounting aperture defined therein.

12. The bracket of claim 10, said vertical mounting base being a chuck-optimized vertical mounting base.

13. The bracket of claim 10, said light-supporting aperture being a large-radiused light-supporting aperture.

14. The bracket of claim 10, said light-supporting aperture being a small-radiused light-supporting aperture.

15. The bracket of claim 10, wherein said bracket is a long bracket having an extension between said light-supporting aperture 2 and said vertical mounting base.

16. The bracket of claim 10, wherein said bracket is a long bracket having an extension between said light-supporting aperture and said vertical mounting base, said extension having at least one vent apertures defined therein.

17. The bracket of claim 10, further including an adapter, said adapter fitting within said light-supporting aperture, said light fitting within said adapter.

18. A bracket for mounting a light, said bracket comprising:

(a) a horizontal surrounding body with a light-supporting aperture defined therein, a string slot is defined in said horizontal surrounding body on opposite sides of said light-supporting aperture; and (b) a vertical mounting base, said horizontal surrounding body associated with said vertical mounting base such that ends of said vertical mounting base extend perpendicularly beyond sides of said horizontal surrounding body in a plane, said horizontal surrounding body and said ends of said vertical mounting base forming a T-shaped bracket; wherein said string slot is unobstructed by said vertical mounting base.

19. The bracket of claim 18, said light-supporting aperture being a large-radiused light-supporting aperture.

20. The bracket of claim 18, said light-supporting aperture being a small-radiused light-supporting aperture.

21. The bracket of claim 18, wherein said bracket is a long bracket having an extension between said light-supporting aperture and said vertical mounting base.

22. The bracket of claim 18, wherein said bracket is a long bracket having an extension between said light-supporting aperture and said vertical 2 mounting base, said extension having at least one vent apertures defined therein.

23. The bracket of claim 18, wherein said light-supporting aperture is configured to receive said light attached to a string and said string slots are configured to receive said string.

24. The bracket of claim 18, further including an adapter, said adapter fitting within said light-supporting aperture, said light fitting within said 2 adapter.

25. A bracket for mounting a light of a light string, said light having a light housing and a light bulb, a string traverses said light housing and extends outward from opposite sides of said light housing, said bracket comprising:

(a) a horizontal surrounding body with a light-supporting aperture defined therein, a string slot is defined in said horizontal surrounding body on opposite sides of said light-supporting aperture; and (b) a vertical mounting base, said horizontal surrounding body associated with said vertical mounting base such that ends of said vertical mounting base extend perpendicularly beyond sides of said horizontal surrounding body in a plane, said horizontal surrounding body and said ends of said vertical mounting base forming a T-shaped bracket; wherein said string slot is unobstructed by said vertical mounting base;

(c) wherein said light-supporting aperture is configured to receive said light and said string slots are configured to receive said string.

26. The bracket of claim 25, said light-supporting aperture being a large-radiused light-supporting aperture.

27. The bracket of claim 25, said light-supporting aperture being a small-radiused light-supporting aperture.

28. The bracket of claim 25, wherein said bracket is a long bracket having an extension between said light-supporting aperture and said vertical mounting base.

29. The bracket of claim 25, wherein said bracket is a long bracket having an extension between said light-supporting aperture and said vertical mounting base, said extension having at least one vent apertures defined therein.

30. The bracket of claim 25, further including an adapter, said adapter fitting within said light-supporting aperture, said light fitting within said adapter.

* * * * *